United States Patent
Kelly et al.

(10) Patent No.: US 7,532,640 B2
(45) Date of Patent: May 12, 2009

(54) SYSTEMS AND METHODS FOR PERFORMING PROTOCOL CONVERSIONS IN A MACHINE

(75) Inventors: Thomas J. Kelly, Dunlap, IL (US); Daniel C. Wood, East Peoria, IL (US); Alan L. Ferguson, Peoria, IL (US); Paul W. Bierdeman, East Peoria, IL (US); Brian L. Jenkins, Washington, IL (US); Trent R. Meiss, Eureka, IL (US); Andrew J. Swanson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 873 days.

(21) Appl. No.: 10/646,716

(22) Filed: Aug. 25, 2003

(65) Prior Publication Data
US 2005/0002417 A1    Jan. 6, 2005

Related U.S. Application Data

(60) Provisional application No. 60/483,915, filed on Jul. 2, 2003.

(51) Int. Cl.
*H04J 3/16* (2006.01)
*H04J 3/22* (2006.01)

(52) U.S. Cl. .................. 370/466; 370/352; 370/401

(58) Field of Classification Search ............ 370/395.53, 370/389, 395.51, 395.5, 395.52, 395.54, 370/465, 466, 467, 352, 353, 40, 401, 313; 709/230; 710/306, 315
See application file for complete search history.

(56) References Cited

U.S. PATENT DOCUMENTS

| | | | |
|---|---|---|---|
| 3,815,091 A | 6/1974 | Kirk | |
| 4,359,733 A | 11/1982 | O'Neill | |
| 4,414,661 A | 11/1983 | Karlstrom | |
| 4,583,206 A | 4/1986 | Rialan et al. | |
| 4,694,408 A | 9/1987 | Zaleski | |
| 4,744,083 A | 5/1988 | O'Neill et al. | |

(Continued)

OTHER PUBLICATIONS

Carlock, M.A., "Radio to Send auto On-Board Diagnostics," IEEE Vehicular Technology Society News, vol. 42, No. 1, pp. 20-22, Feb. 1995.

(Continued)

*Primary Examiner*—Edan Orgad
*Assistant Examiner*—Chuong T Ho
(74) *Attorney, Agent, or Firm*—Finnegan, Henderson, Farabow, Garrett & Dunner

(57) ABSTRACT

Methods and systems are provided for performing protocol conversions in an environment including a work machine having one or more modules coupled to one or more data links. Such methods and systems may leverage one or more gateways to perform tunneling, translating, and bridging operations. Tunneling processes may include receiving a message from a source module in a first protocol, encapsulating the message within transmission units of a second protocol, and transmitting the encapsulated message via the second protocol. Translating processes may include receiving, by the gateway, a message in a first data link protocol including a parameter identifier. The gateway may match the parameter identifier with a parameter identifier included in a translation table and scale associated parameter data using a scale factor corresponding to a second data link protocol. The gateway may then provide the scaled parameter data to a module using the second data link protocol.

9 Claims, 11 Drawing Sheets

U.S. PATENT DOCUMENTS

| | | | |
|---|---|---|---|
| 4,804,937 A | 2/1989 | Barbiaux et al. |
| 4,896,261 A | 1/1990 | Nolan |
| 4,924,391 A | 5/1990 | Hirano et al. |
| 4,926,331 A | 5/1990 | Windle et al. |
| 4,929,941 A | 5/1990 | Lecocq |
| 4,975,846 A | 12/1990 | Abe et al. |
| 5,003,479 A | 3/1991 | Kobayashi et al. |
| 5,025,253 A | 6/1991 | DiLullo et al. |
| 5,077,670 A | 12/1991 | Takai et al. |
| 5,090,012 A | 2/1992 | Kajiyama et al. |
| 5,132,905 A | 7/1992 | Takai et al. |
| 5,157,610 A | 10/1992 | Asano et al. |
| 5,168,272 A | 12/1992 | Akashi et al. |
| 5,218,356 A | 6/1993 | Knapp |
| 5,274,638 A | 12/1993 | Michihira et al. |
| 5,307,509 A | 4/1994 | Michalon et al. |
| 5,309,436 A | 5/1994 | Hirano et al. |
| 5,343,319 A | 8/1994 | Moore |
| 5,343,470 A | 8/1994 | Hideshima et al. |
| 5,343,472 A | 8/1994 | Michihira et al. |
| 5,365,436 A | 11/1994 | Schaller et al. |
| 5,387,994 A | 2/1995 | McCormack et al. |
| 5,400,018 A | 3/1995 | Scholl et al. |
| 5,425,051 A | 6/1995 | Mahany |
| 5,448,479 A | 9/1995 | Kemner et al. |
| 5,459,660 A | 10/1995 | Berra |
| 5,463,567 A | 10/1995 | Boen et al. |
| 5,479,157 A | 12/1995 | Suman et al. |
| 5,479,479 A | 12/1995 | Braitberg et al. |
| 5,495,469 A | 2/1996 | Halter et al. |
| 5,523,948 A | 6/1996 | Adrain |
| 5,526,357 A | 6/1996 | Jandrell |
| 5,541,840 A | 7/1996 | Gurne et al. |
| 5,555,498 A | 9/1996 | Berra et al. |
| 5,588,002 A | 12/1996 | Kawanishi et al. |
| 5,604,854 A | 2/1997 | Luse et al. |
| 5,606,556 A | 2/1997 | Kawanishi et al. |
| 5,619,412 A | 4/1997 | Hapka |
| 5,629,941 A | 5/1997 | Kawanishi et al. |
| 5,640,444 A | 6/1997 | O'Sullivan |
| 5,657,317 A | 8/1997 | Mahany et al. |
| 5,659,702 A | 8/1997 | Hashimoto et al. |
| 5,710,984 A | 1/1998 | Millar et al. |
| 5,712,782 A | 1/1998 | Weigelt et al. |
| 5,732,074 A | 3/1998 | Spaur et al. |
| 5,737,335 A | 4/1998 | Mizuta et al. |
| 5,737,711 A | 4/1998 | Abe |
| 5,764,919 A | 6/1998 | Hashimoto |
| 5,781,125 A | 7/1998 | Godau et al. |
| 5,790,536 A | 8/1998 | Mahany et al. |
| 5,790,965 A | 8/1998 | Abe |
| 5,809,432 A | 9/1998 | Yamashita |
| 5,844,953 A | 12/1998 | Heck et al. |
| 5,848,368 A | 12/1998 | Allen et al. |
| 5,856,976 A | 1/1999 | Hirano |
| 5,884,202 A | 3/1999 | Arjomand |
| 5,884,206 A | 3/1999 | Kim |
| 5,896,418 A | 4/1999 | Hamano et al. |
| 5,916,287 A | 6/1999 | Arjomand et al. |
| 5,938,716 A | 8/1999 | Shutty et al. |
| 5,949,776 A | 9/1999 | Mahany et al. |
| 5,957,985 A | 9/1999 | Wong et al. |
| 5,982,781 A | 11/1999 | Przybyla et al. |
| 5,999,876 A | 12/1999 | Irons et al. |
| 6,009,370 A | 12/1999 | Minowa et al. |
| 6,025,776 A | 2/2000 | Matsuura |
| 6,037,901 A | 3/2000 | Devier et al. |
| 6,052,632 A | 4/2000 | Iihoshi et al. |
| 6,052,788 A | 4/2000 | Wesinger et al. |
| 6,061,614 A | 5/2000 | Carrender et al. |
| 6,064,299 A | 5/2000 | Lesesky et al. |
| 6,067,302 A | 5/2000 | Tozuka |
| 6,073,063 A | 6/2000 | Leong Ong et al. |
| 6,075,451 A | 6/2000 | Lebowitz et al. |
| 6,084,870 A | 7/2000 | Wooten et al. |
| 6,104,971 A | 8/2000 | Fackler |
| 6,111,524 A | 8/2000 | Lesesky et al. |
| 6,111,893 A | 8/2000 | Volftsun et al. |
| 6,112,139 A | 8/2000 | Schubert et al. |
| 6,114,970 A | 9/2000 | Kirson et al. |
| 6,122,514 A | 9/2000 | Spaur et al. |
| 6,125,309 A | 9/2000 | Fujimoto |
| 6,131,019 A | 10/2000 | King |
| 6,134,488 A | 10/2000 | Sasaki et al. |
| 6,144,905 A | 11/2000 | Gannon |
| 6,151,298 A | 11/2000 | Bernhardsson et al. |
| 6,151,306 A | 11/2000 | Ogasawara et al. |
| 6,167,337 A | 12/2000 | Haack et al. |
| 6,169,943 B1 | 1/2001 | Simon et al. |
| 6,177,867 B1 | 1/2001 | Simon et al. |
| 6,181,994 B1 | 1/2001 | Colson et al. |
| 6,185,491 B1 | 2/2001 | Gray et al. |
| 6,189,057 B1 | 2/2001 | Schwanz et al. |
| 6,195,602 B1 | 2/2001 | Hazama et al. |
| 6,198,989 B1 | 3/2001 | Tankhilevich et al. |
| 6,201,316 B1 | 3/2001 | Knecht |
| 6,202,008 B1 | 3/2001 | Beckert et al. |
| 6,202,012 B1 | 3/2001 | Gile et al. |
| 6,225,898 B1 | 5/2001 | Kamiya et al. |
| 6,230,181 B1 | 5/2001 | Mitchell et al. |
| 6,236,909 B1 | 5/2001 | Colson et al. |
| 6,263,268 B1 | 7/2001 | Nathanson |
| 6,272,120 B1 | 8/2001 | Alexander |
| 6,275,167 B1 | 8/2001 | Dombrowski et al. |
| 6,278,921 B1 | 8/2001 | Harrison et al. |
| 6,285,925 B1 | 9/2001 | Steffen |
| 6,292,862 B1 | 9/2001 | Barrenscheen et al. |
| 6,295,492 B1 | 9/2001 | Lang et al. |
| 6,314,351 B1 | 11/2001 | Chutorash |
| 6,314,422 B1 | 11/2001 | Barker et al. |
| 6,317,838 B1 | 11/2001 | Baize |
| 6,321,142 B1 | 11/2001 | Shutty |
| 6,321,148 B1 | 11/2001 | Leung |
| 6,327,263 B1 | 12/2001 | Nakatsuji |
| 6,330,499 B1 | 12/2001 | Chou et al. |
| 6,343,249 B1 | 1/2002 | Sakai et al. |
| 6,353,776 B1 | 3/2002 | Rohrl et al. |
| 6,356,813 B1 | 3/2002 | Sommer et al. |
| 6,356,822 B1 | 3/2002 | Diaz et al. |
| 6,370,449 B1 | 4/2002 | Razavi et al. |
| 6,370,456 B1 | 4/2002 | Eiting et al. |
| 6,381,523 B2 | 4/2002 | Sone |
| 6,405,111 B2 | 6/2002 | Rogers et al. |
| 6,407,554 B1 | 6/2002 | Godau et al. |
| 6,408,232 B1 | 6/2002 | Cannon et al. |
| 6,411,203 B1 | 6/2002 | Lesesky et al. |
| 6,415,210 B2 | 7/2002 | Hozuka et al. |
| 6,427,101 B1 | 7/2002 | Diaz et al. |
| 6,430,164 B1 | 8/2002 | Jones et al. |
| 6,430,485 B1 | 8/2002 | Hullinger |
| 6,434,455 B1 | 8/2002 | Snow et al. |
| 6,434,458 B1 | 8/2002 | Laguer-Diaz et al. |
| 6,434,459 B2 | 8/2002 | Wong et al. |
| 6,438,468 B1 | 8/2002 | Muxlow et al. |
| 6,438,471 B1 | 8/2002 | Katagishi et al. |
| 6,449,884 B1 | 9/2002 | Watanabe et al. |
| 6,459,969 B1 | 10/2002 | Bates et al. |
| 6,460,096 B1 | 10/2002 | Hesse et al. |
| 6,466,861 B2 | 10/2002 | Little |
| 6,470,260 B2 | 10/2002 | Martens et al. |
| 6,473,839 B1 | 10/2002 | Kremser et al. |
| 6,479,792 B1 | 11/2002 | Beiermann et al. |
| 6,480,928 B2 | 11/2002 | Yashiki et al. |
| 6,484,082 B1 | 11/2002 | Millsap et al. |

| | | |
|---|---|---|
| 6,487,717 B1 | 11/2002 | Brunemann et al. |
| 6,501,368 B1 | 12/2002 | Wiebe et al. |
| 6,505,105 B2 | 1/2003 | Allen et al. |
| 6,512,970 B1 | 1/2003 | Albert |
| 6,516,192 B1 | 2/2003 | Spaur et al. |
| 6,526,340 B1 | 2/2003 | Reul et al. |
| 6,526,460 B1 | 2/2003 | Dauner et al. |
| 6,529,159 B1 | 3/2003 | Fan et al. |
| 6,529,808 B1 | 3/2003 | Diem |
| 6,529,812 B1 | 3/2003 | Koehrsen et al. |
| 6,535,803 B1 | 3/2003 | Fennel |
| 6,539,296 B2 | 3/2003 | Diaz et al. |
| 6,542,799 B2 | 4/2003 | Mizutani et al. |
| 6,549,833 B2 | 4/2003 | Katagishi et al. |
| 6,553,039 B1 | 4/2003 | Huber et al. |
| 6,553,291 B2 | 4/2003 | Matsui |
| 6,553,292 B2 | 4/2003 | Kokes et al. |
| 6,556,899 B1 | 4/2003 | Harvey et al. |
| 6,560,516 B1 | 5/2003 | Baird et al. |
| 6,560,517 B2 | 5/2003 | Matsui |
| 6,564,127 B1 | 5/2003 | Bauerle et al. |
| 6,567,730 B2 | 5/2003 | Tanaka |
| 6,571,136 B1 | 5/2003 | Staiger |
| 6,574,734 B1 | 6/2003 | Colson et al. |
| 6,580,953 B1 | 6/2003 | Wiebe et al. |
| 6,580,983 B2 | 6/2003 | Laguer-Diaz et al. |
| 6,587,768 B2 | 7/2003 | Chene et al. |
| 6,608,554 B2 | 8/2003 | Lesesky et al. |
| 6,611,740 B2 | 8/2003 | Lowery et al. |
| 6,625,135 B1 | 9/2003 | Johnson et al. |
| 6,629,032 B2 | 9/2003 | Akiyama |
| 6,636,789 B2 | 10/2003 | Bird et al. |
| 6,647,323 B1 | 11/2003 | Robinson et al. |
| 6,647,328 B2 | 11/2003 | Walker |
| 6,654,669 B2 | 11/2003 | Eisenmann et al. |
| 6,662,091 B2 | 12/2003 | Wilson et al. |
| 6,694,235 B2 | 2/2004 | Akiyama |
| 6,728,603 B2 | 4/2004 | Pruzan et al. |
| 6,738,701 B2 | 5/2004 | Wilson |
| 6,744,352 B2 | 6/2004 | Lesesky et al. |
| 6,754,183 B1 | 6/2004 | Razavi et al. |
| 6,778,837 B2 | 8/2004 | Bade et al. |
| 6,865,460 B2 | 3/2005 | Bray et al. |
| 6,901,449 B1 * | 5/2005 | Selitrennikoff et al. ....... 709/230 |
| 6,922,786 B1 | 7/2005 | Ong |
| 6,970,127 B2 | 11/2005 | Rakib |
| 6,970,459 B1 * | 11/2005 | Meier .......................... 370/389 |
| 6,975,612 B1 | 12/2005 | Razavi et al. |
| 7,020,708 B2 | 3/2006 | Nelson et al. |
| 7,046,638 B1 * | 5/2006 | Klausner et al. ............ 370/313 |
| 7,054,319 B2 * | 5/2006 | Akahane et al. ......... 370/395.53 |
| 7,089,343 B2 * | 8/2006 | Bahren ....................... 710/306 |
| 7,177,652 B1 | 2/2007 | Hopper et al. |
| 7,180,908 B2 * | 2/2007 | Valavi et al. ................ 370/465 |
| 7,257,472 B2 * | 8/2007 | Hauer et al. .................. 701/29 |
| 7,418,481 B2 * | 8/2008 | Fredriksson ................ 709/217 |
| 2001/0025323 A1 | 9/2001 | Sodergren |
| 2001/0030972 A1 | 10/2001 | Donaghey |
| 2001/0041956 A1 | 11/2001 | Wong et al. |
| 2001/0050922 A1 | 12/2001 | Tiernay et al. |
| 2001/0051863 A1 | 12/2001 | Razavi et al. |
| 2001/0056323 A1 | 12/2001 | Masters et al. |
| 2002/0003781 A1 | 1/2002 | Kikkawa et al. |
| 2002/0006139 A1 | 1/2002 | Kikkawa et al. |
| 2002/0007237 A1 | 1/2002 | Phung et al. |
| 2002/0019689 A1 | 2/2002 | Harrison et al. |
| 2002/0032507 A1 | 3/2002 | Diaz et al. |
| 2002/0032511 A1 | 3/2002 | Murakami et al. |
| 2002/0032853 A1 | 3/2002 | Preston |
| 2002/0035429 A1 | 3/2002 | Banas |
| 2002/0038172 A1 | 3/2002 | Kinugawa |
| 2002/0042670 A1 | 4/2002 | Diaz et al. |
| 2002/0069262 A1 | 6/2002 | Rigori et al. |
| 2002/0070845 A1 | 6/2002 | Reisinger et al. |
| 2002/0082753 A1 | 6/2002 | Guskov et al. |
| 2002/0099487 A1 | 7/2002 | Suganuma et al. |
| 2002/0103582 A1 | 8/2002 | Ohmura et al. |
| 2002/0103583 A1 | 8/2002 | Ohmura et al. |
| 2002/0105968 A1 | 8/2002 | Pruzan et al. |
| 2002/0107624 A1 | 8/2002 | Rutz |
| 2002/0110146 A1 | 8/2002 | Thayer et al. |
| 2002/0116103 A1 | 8/2002 | Matsunaga et al. |
| 2002/0116116 A1 | 8/2002 | Mathew et al. |
| 2002/0123828 A1 | 9/2002 | Bellmann et al. |
| 2002/0123832 A1 | 9/2002 | Gotvall et al. |
| 2002/0123833 A1 | 9/2002 | Sakurai et al. |
| 2002/0126632 A1 | 9/2002 | Terranova |
| 2002/0138178 A1 | 9/2002 | Bergmann et al. |
| 2002/0138188 A1 | 9/2002 | Watanabe et al. |
| 2002/0150050 A1 | 10/2002 | Nathanson |
| 2002/0154605 A1 | 10/2002 | Preston et al. |
| 2002/0156558 A1 | 10/2002 | Hanson et al. |
| 2002/0161495 A1 | 10/2002 | Yamaki |
| 2002/0161496 A1 | 10/2002 | Yamaki |
| 2002/0161820 A1 | 10/2002 | Pellegrino et al. |
| 2002/0167965 A1 | 11/2002 | Beasley et al. |
| 2002/0169529 A1 | 11/2002 | Kim |
| 2002/0173889 A1 | 11/2002 | Odinak et al. |
| 2002/0183904 A1 | 12/2002 | Sakurai et al. |
| 2002/0193925 A1 | 12/2002 | Funkhouser et al. |
| 2002/0196771 A1 | 12/2002 | Vij et al. |
| 2002/0198639 A1 | 12/2002 | Ellis et al. |
| 2003/0004624 A1 | 1/2003 | Wilson et al. |
| 2003/0009271 A1 | 1/2003 | Akiyama |
| 2003/0014179 A1 | 1/2003 | Szukala et al. |
| 2003/0014521 A1 | 1/2003 | Elson et al. |
| 2003/0016636 A1 | 1/2003 | Tari et al. |
| 2003/0021241 A1 | 1/2003 | Dame et al. |
| 2003/0028297 A1 | 2/2003 | Iihoshi et al. |
| 2003/0028811 A1 | 2/2003 | Walker et al. |
| 2003/0033061 A1 | 2/2003 | Chen et al. |
| 2003/0035437 A1 | 2/2003 | Garahi et al. |
| 2003/0037466 A1 | 2/2003 | Komatsu et al. |
| 2003/0043739 A1 | 3/2003 | Reinold et al. |
| 2003/0043750 A1 | 3/2003 | Remboski et al. |
| 2003/0043779 A1 | 3/2003 | Remboski et al |
| 2003/0043793 A1 | 3/2003 | Reinold et al. |
| 2003/0043799 A1 | 3/2003 | Reinold et al. |
| 2003/0043824 A1 | 3/2003 | Remboski et al. |
| 2003/0046327 A1 | 3/2003 | Reinold et al. |
| 2003/0046435 A1 | 3/2003 | Lind et al. |
| 2003/0050747 A1 | 3/2003 | Kamiya |
| 2003/0053433 A1 | 3/2003 | Chun |
| 2003/0060953 A1 | 3/2003 | Chen |
| 2003/0065771 A1 | 4/2003 | Cramer et al. |
| 2003/0069680 A1 | 4/2003 | Cohen et al. |
| 2003/0074118 A1 | 4/2003 | Rogg et al. |
| 2003/0088347 A1 | 5/2003 | Ames |
| 2003/0093199 A1 | 5/2003 | Mavreas |
| 2003/0093203 A1 | 5/2003 | Adachi et al. |
| 2003/0093204 A1 | 5/2003 | Adachi et al. |
| 2003/0097477 A1 | 5/2003 | Vossler |
| 2003/0105565 A1 | 6/2003 | Loda et al. |
| 2003/0105566 A1 | 6/2003 | Miller |
| 2003/0114966 A1 | 6/2003 | Ferguson et al. |
| 2003/0117298 A1 | 6/2003 | Tokunaga et al. |
| 2003/0120395 A1 | 6/2003 | Kacel |
| 2003/0130776 A1 | 7/2003 | Busse |
| 2003/0167112 A1 | 9/2003 | Akiyama |
| 2003/0182467 A1 | 9/2003 | Jensen et al. |
| 2003/0200017 A1 | 10/2003 | Capps et al. |
| 2003/0224787 A1 | 12/2003 | Gandolfo |
| 2004/0039500 A1 | 2/2004 | Amendola et al. |
| 2004/0052257 A1 | 3/2004 | Abdo et al. |
| 2004/0081178 A1 | 4/2004 | Fujimori |
| 2004/0111188 A1 | 6/2004 | McClure et al. |

| | | | |
|---|---|---|---|
| 2004/0158362 | A1 | 8/2004 | Fuehrer et al. |
| 2004/0167690 | A1 | 8/2004 | Yamada |
| 2004/0225740 | A1 | 11/2004 | Klemba et al. |
| 2004/0268113 | A1* | 12/2004 | Rothman et al. ............... 713/2 |
| 2005/0002354 | A1 | 1/2005 | Kelly et al. |
| 2005/0002417 | A1 | 1/2005 | Kelly et al. |
| 2005/0005167 | A1 | 1/2005 | Kelly et al. |
| 2005/0021860 | A1 | 1/2005 | Kelly et al. |
| 2005/0243779 | A1 | 11/2005 | Bolz |
| 2007/0047228 | A1 | 3/2007 | Froeschl et al. |

OTHER PUBLICATIONS

Davis, Jr. P.D. et al., "Hydrometeorological Data Collection System for Lake Ontario," IEEE '71 Engineering in the Ocean Environment Conference, pp. 180-183, 1971.

Leinfelder, C. et al., "Radio Diagnostics for the ICE [electric locomotive]," Signal und Draht, vol. 89, Nos. 7-8, pp. 18-20, Jul.-Aug. 22, 1997.

Senninger, H., "Prometheus Phase 3, Teilprojekt: On-Board Network, Schlussbericht," NTIS Journal Annoucement, GRA19621, Apr. 1995.

Carlock, M.A., "Incorporation of Radio Transponders into Vehicular On-Board Diagnostics Systems," Leading Change: the Transportation Electronic Revolution: Proceedings of the 1994 International Congress on Transportation Electronics, pp. 111-114, 1994.

Katoh, T. et al., "Electronics Progress in Automotive Parts and Service Engineering," Leading Change: the Transportation Electronic Revolution: Proceedings of the 1994 International Congress on Transportation Electronics, pp. 497-502, Oct. 1994.

Mogi, T., "Prospects for Failure Diagnostics of Automotive Electronic Control Systems," Leading Change: the Transportation Electronic Revolution: Proceedings of the 1994 International Congress on Transportation Electronics, pp. 477-488, Oct. 1994.

Choe, Howard C. et al., "Neural Pattern Identification of Railroad Wheel-Bearing Faults From Audible Acoustic Signals: Comparison of FFT, CWT, and DWT Features," Proceedings SPIE-The International Society for Optical Engineering, Wavelett Applications IV, vol. 3078, pp. 480-496, Apr. 1997.

Perkins and Royer, "Ad-hoc On-demand Distance Vector Routing," IEEE Conference Proceeding, Feb. 1999, pp. 1-11.

Peterson and Davie, "Computer Networks: A System Approach, 2nd Edition,"Morgan Kaugmann Publishers, Oct. 1999, pp. 284-292.

Comer, Douglas E., "Internetworking with TCP/IP vol. 1,"© 1995 Prentice-Hall Inc., Chapter 29, pp. 489-509.

Deering et al., "Internet Protocol, Version 6 (IPv6) Specification,"© 1995 Network Working Group, pp. 1-37, http://www.ietf.org/rfc/rfc1883.txt.

Hagino et al., "An IPv6-to-IPv4 Transport Relay Translator,"© 2001 The Internet Society, pp. 1-11, htpp://www.ietf.org/rfc/rfc3142.txt.

"Microsoft TechNet: The Cable Guy—Apr. 2003: Windows Peer-to-Peer Networking," 6 pages, http://web.archiveorg/web/2004061210553, http://www.microsoft.com/technet/community/columns/cableguy/cg0403.mspx.

Office Action dated Mar. 31, 2008 in U.S. Appl. No. 10/646,684 (16 pages).

Office Action dated Aug. 23, 2007 in U.S. Appl. No. 10/646,684 (13 pages).

Office Action dated Jun. 30, 2008 in U.S. Appl. No. 10/646,809 (13 pages).

Office Action dated Jan. 25, 2008 in U.S. Appl. No. 10/646,809 (17 pages).

Office Action dated Aug. 10, 2007 in U.S. Appl. No. 10/646,809 (15 pages).

Office Action dated Feb. 7, 2007 in U.S. Appl. No. 10/646,809 (17 pages).

Examiner's Answer dated May 16, 2008 in U.S. Appl. No. 10/646,685 (14 pages).

Office Action dated Feb. 6, 2007 in U.S. Appl. No. 10/646,685 (11 pages).

Office Action dated Jun. 28, 2006 in U.S. Appl. No. 10/646,685 (10 pages).

Office Action dated Jan. 4, 2006 in U.S. Appl. No. 10/646,685 (6 pages).

Office Action dated Apr. 18, 2005 in U.S. Appl. No. 10/646,685 (7 pages).

Office Action dated Oct. 6, 2004 in U.S. Appl. No. 10/646,685 (6 pages).

Office Action dated May 14, 2008 in U.S. Appl. No. 10/646,714 (10 pages).

Office Action dated Oct. 9, 2007 in U.S. Appl. No. 10/646,714 (11 pages).

Office Action dated Feb. 9, 2007 in U.S. Appl. No. 10/646,714 (10 pages).

* cited by examiner

| Parameter Identifier | PDL | Web | J1939 | RS-422 | Universal Storage (US) |
|---|---|---|---|---|---|
| PID 1 (rpm) | x1 | x1/2 | x10 | x100 | 200 |
| PID 2 (temperature) | Scale | Scale | Scale | Scale | Value |
| ... | ... | ... | ... | ... | ... |
| PID R-1 | | Scale | Scale | Scale | |
| PID R | | Scale | Scale | Scale | Value |

SYSTEMS AND METHODS FOR PERFORMING PROTOCOL CONVERSIONS IN A MACHINE

CROSS REFERENCE TO RELATED APPLICATIONS

This application claims the benefit of U.S. Provisional Application Ser. No. 60/483,915 entitled "Systems and Methods for Interfacing Off-Board and On-Board Networks in a Work Machine," filed Jul. 2, 2003, owned by the assignee of this application and expressly incorporated herein by reference in its entirety.

This application is related to U.S. application Ser. No. 10/646,684, entitled "SYSTEMS AND METHODS FOR PROVIDING SERVER OPERATIONS IN A WORK MACHINE," filed Aug. 25, 2003, U.S. application Ser. No. 10/646,714, entitled "SYSTEMS AND METHODS FOR PROVIDING SECURITY OPERATIONS IN A WORK MACHINE," filed Aug. 25, 2003, U.S. application Ser. No. 10/646,809, entitled "SYSTEMS AND METHODS FOR PROVIDING NETWORK COMMUNICATIONS BETWEEN WORK MACHINES," filed Aug. 25, 2003, and U.S. application Ser. No. 10/646,685, entitled "METHODS AND SYSTEMS FOR PROVIDING PROXY CONTROL FUNCTIONS IN A WORK MACHINE," filed Aug. 25, 2003, each owned by the assignee of this application and expressly incorporated herein by reference in its entirety.

TECHNICAL FIELD

This invention relates generally to network interface systems and more particularly, to systems and methods for performing protocol conversions in a work machine.

BACKGROUND

An important feature in modern work machines (e.g., fixed and mobile commercial machines, such as construction machines, fixed engine systems, marine-based machines, etc.) is the on-board electronic communications, monitoring, and control network. An on-board network includes many different modules connected to various types of communication links. These links may be proprietary and non-proprietary, such as manufacturer-based data links and communication paths based on known industry standards (e.g., J1939, RS-232, RP1210, RS-422, RS-485, MODBUS, CAN, etc.). Other features implemented with work machines are off-board networks, such as wireless networks (e.g., cellular), satellite networks (e.g., GPS), and TCP/IP-based networks.

On-board modules may communicate with other on-board or off-board modules to perform various functions related to the operation of the work machine. For example, display modules may receive sensor data from an engine control module via a J1939 data link, while another control module connected to a proprietary data link may provide data to another module connected to the same link. Also, an on-board module may send data to an off-board system using a different communication path extending from the work machine to the off-board system.

Problems arise, however, when modules connected to different types of data links need to communicate. These problems become especially acute as the number of data links and protocols on a given work machine increases. For example, communicating information from various protocols (e.g., J1939, RS232, RP1210, RS-422, RS-485, MODBUS, CAN, ISO11783, ATA, etc.) over a TCP/IP-based network may be problematical in current work machine environments. In addition, communicating information from multiple and different data links over a single data link protocol may pose particular difficulties. Similarly, difficulties may be presented when modules connected to multiple and different data links simultaneously require information from a single disparate physical layer. Further, problems arise when legacy systems need to communicate with other, perhaps newer, systems that are not compatible with the legacy protocols.

In certain instances, an inability to translate and communicate among and between protocols may impose significant limitations on the design and configuration of work machines and modules. For example, the placement of modules within a given work machine or environment may be limited to the range of a particular protocol. Maritime-specific modules, for instance, may only be placed within a relatively short distance of the vessel's engine due to the limitations of a J1939 data link. In certain applications, an Engine Control Module (ECM) connected to a J1939 link may need to communicate with a J1939 display module. The distance at which the display can be located from the ECM is therefore dictated by the J1939 data link range. This constraint may impose limitations not only on the placement of the two modules, but on other systems and modules in the work machine or environment.

To address these problems, conventional systems may incorporate various interface devices to facilitate communications between different types of data links. Although this solution may be functionally acceptable in some instances, their implementations are restricted due to the hardware and service capabilities associated with the types of data links used in a work machine. Further, the additional hardware may take up valuable space needed for other components used by the machine.

U.S. Pat. No. 5,555,498 to Berra et al. describes an interface adapter for vehicle computer systems. The adapter enables existing diagnostic tools, which operate using standard communication signals, to interact with newer on-board vehicle controllers that may use incompatible communication protocols. The adapter allows the existing diagnostic tools to operate transparent of the adapter's presence. Although Berra et al. provides a solution for interfacing existing systems with newer controllers, it is limited to diagnostic tools that communicate with on-board vehicle controllers. Further, the system described by Berra et al. does not accommodate communicating information from multiple and different data links over a single data link protocol and communicating information from a single data link to multiple and different modules. In addition, Berra et al.'s system cannot determine when protocols are inconsistent and provide corresponding interface services. Also, the system does not address the problems associated with the limited useable range of certain protocols.

Methods, systems, and articles of manufacture consistent with certain embodiments of the present invention are directed to solving one or more of the problems set forth above.

SUMMARY OF THE INVENTION

Consistent with embodiments of the present invention, methods and systems may be provided for performing protocol conversions in an environment including a work machine having one or more modules coupled to one or more data links. Such methods and systems may leverage one or more gateways to perform tunneling, translating, and bridging operations.

Tunneling processes consistent with embodiments of the present invention may include receiving, by a gateway, a message from a source module in a first protocol. The gateway may encapsulate the message within transmission units of a second protocol and output the encapsulated message on a second data link using the second protocol. A destination module may receive the encapsulated message from the second data link and extract the message from second protocol transmission unit.

Translating processes consistent with embodiments of the present invention may include receiving, by the gateway, a message in a first data link protocol including a parameter identifier. The gateway may match the parameter identifier with a parameter identifier included in a translation table and scale associated parameter data using a scale factor corresponding to a second data link protocol. The gateway may then provide the scaled parameter data to a module using the second data link protocol.

Consistent with embodiments of the present invention, a first gateway may receive a message, from a source module, on a first data link that uses a first protocol. The gateway may encapsulate the received message within a transmission unit consistent with a second protocol. The gateway could, alternatively, translate the received message into a comparable message of the second protocol. The encapsulated (or translated) message may be broadcasted on a second data link using the second protocol and received by a second gateway. The second gateway may extract the message from the second protocol transmission unit and route the extracted message to a destination module. The second gateway may, in addition or as an alternative to extracting, translate the message received from the second data link. In certain implementations, the destination module may be located at a distance from the source module that exceeds a transmission range of the first protocol.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings:

FIG. 9 illustrates an exemplary translation table consistent with embodiments of the present invention;

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Overview

Figure 1:
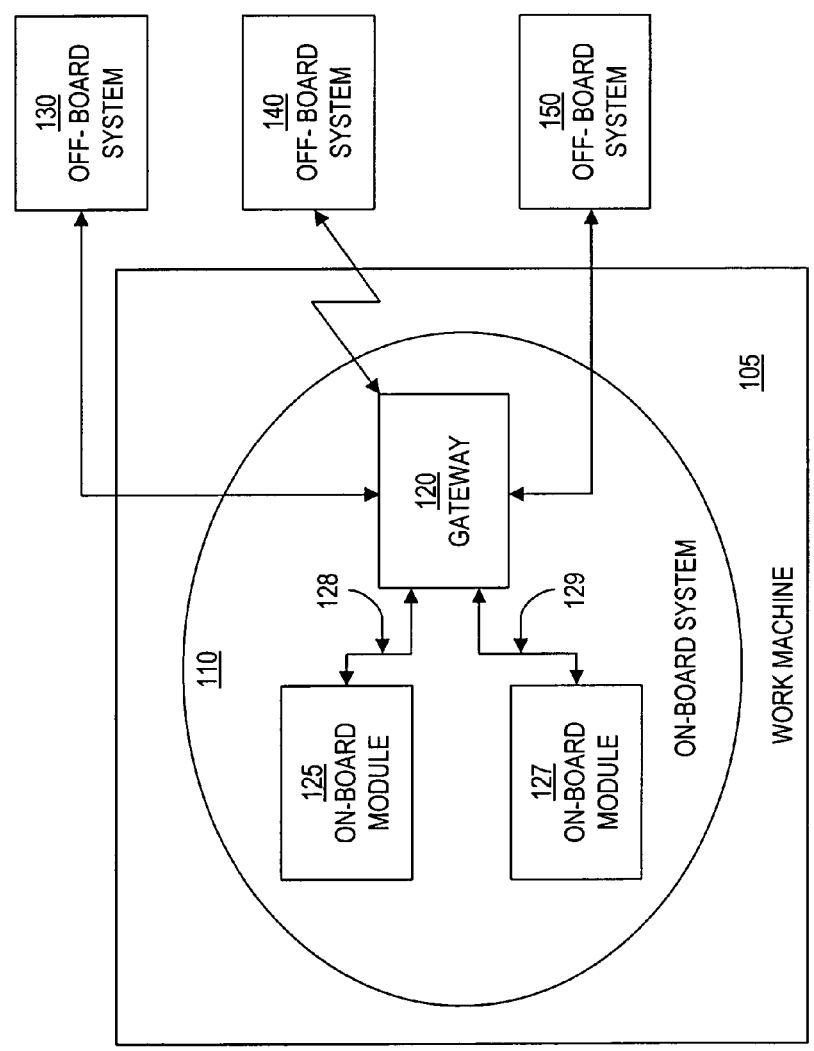
FIG. 1 is a block diagram of an exemplary system that may be configured to perform certain functions consistent with embodiments of the present invention.

FIG. 1 illustrates an exemplary system 100 in which features and principles consistent with an embodiment of the present invention may be implemented. As shown in FIG. 1, system 100 may include a work machine 105 including an on-board system 110 comprising a gateway 120 and on-board modules 125, 127. System 100 may also include one or more off-board systems 130-150. Although gateway 120 is shown as a separate element, methods and systems consistent with the present invention may allow gateway 120 to be included in one or more elements, such as on-board modules 125 and/or 127.

A work machine, as used herein, refers to a fixed or mobile machine that performs some type of operation associated with a particular industry, such as mining, construction, farming, etc. and operates between or within work environments (e.g., construction site, mine site, power plant, etc.). A non-limiting example of a fixed machine includes an engine system operating in a plant, off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment.

An on-board module, as used herein, may represent any type of component operating in work machine 105 that controls or is controlled by other components or sub-components. For example, an on-board module may be an operator display device, an Engine Control Module (ECM), a power system control module, a Global Positioning System (GPS) interface device, an attachment interface that connects one or more sub-components, and any other type of device work machine 105 may use to facilitate operations of the machine during run time or non-run time conditions (i.e., machine engine running or not running, respectively).

An off-board system, as used herein, may represent a system that is located remote from work machine 105. An off-board system may be a system that connects to on-board system 110 through wireline or wireless data links. Further, an off-board system may be a computer system including known computing components, such as one or more processors, software, display, and interface devices that operate collectively to perform one or more processes. Alternatively, or additionally, an off-board system may include one or more communications devices that facilitates the transmission of data to and from on-board system 110.

Gateway 120 represents one or more interface devices configured to perform functions consistent with various embodiments of the present invention. Gateway 120 may be configured with various types of hardware and software depending on its application within a work machine. Thus, in accordance with embodiments of the invention, gateway 120 may provide interface capability that facilitates the transmission of data to and from on-board system 110, performs various data processing functions, and maintains data for use by one or more on-board modules or off-board systems. For example, gateway 120 may be configured to perform protocol conversions (e.g., tunneling and translations), intelligent routing, and server-based operations, such as data provisioning, application provisioning, Web server operations, electronic mail server operations, data traffic management, and any other type of server-based operations that enable on-board system 110 to retrieve, generate, and/or provide data with on-board and/or off-board systems. For clarity of explanation, FIG. 1 depicts gateway 120 as a distinct element. However, consistent with principles of the present invention, "gateway" functionality may be implemented via software, hardware, and/or firmware within one or more modules (e.g., 125 and/or 127) on a network, which controls a system on a work machine and communicates with an off-board system. Thus, gateway 120 may, in certain embodiments, represent functionality or logic embedded within another element.

On-board module 125 represents one or more on-board modules connected to one or more proprietary data links 128 included in on-board system 110. On-board module 127 may be one or more on-board modules connected to a non-proprietary data link 129, such as Society of Automotive Engineers (SAE) standard data links including Controller Area Network (CAN), J1939, etc. standard data links.

As shown in FIG. 1, gateway 120 also interfaces with one or more off-board systems 130-150. In one exemplary embodiment, off-board systems 130-150 include, for example, computer system 130, computer system 140, and service port system 150.

Computer system 130 represents one or more computing systems each executing one or more software applications. For example, computer system 130 may be a workstation, personal digital assistant, laptop, mainframe, etc. Computer system 130 may include Web browser software that requests and receives data from a server when executed by a processor and displays content to a user operating the system. In one embodiment of the invention, computer system 130 is connected to on-board system 110 through one or more wireline based data links, such as a Local Area Network (LAN), an Extranet, and the Internet using an Ethernet connection based on TCP/IP.

Computer system 140 also represents one or more computing systems each executing one or more software applications. Computer system 140 may be a workstation, personal digital assistant, laptop, mainframe, etc. Also, computer system 140 may include Web browser software that requests and receives data from a server when executed by a processor and displays content to a user operating the system. In one embodiment of the invention, computer system 140 is connected to on-board system 110 through one or more wireless based data links, such as cellular, satellite, and radio-based communication data links.

Computer systems 130 and 140 may each be associated with a user (e.g., customer), multiple users, a business entity (dealer, manufacturer, vendor, etc.), a department of a business entity (e.g., service center, operations support center, logistics center, etc.), and any other type of entity that sends and/or receives information to/from on-board system 110. Further, computer system 130 and 140 may each execute off-board software applications that download or upload information to/from on-board system 110 via gateway 120. In certain embodiments, computer systems 130 and 140 may include one or more controllers such as a PLC (Programmable Logic Controller), which could be used in plants/factories.

Service system 150 represent one or more portable, or fixed, service systems that perform diagnostics and/or service operations that include receiving and sending messages to on-board system 110 via gateway 120. For example, service system 150 may be a electronic testing device that connects to on-board system 120 through an RS-232 serial data link. Using service system 150, a user or an application executed by a processor may perform diagnostics and service operations on any of on-board system modules 125, 127 through gateway 120.

Figure 2:
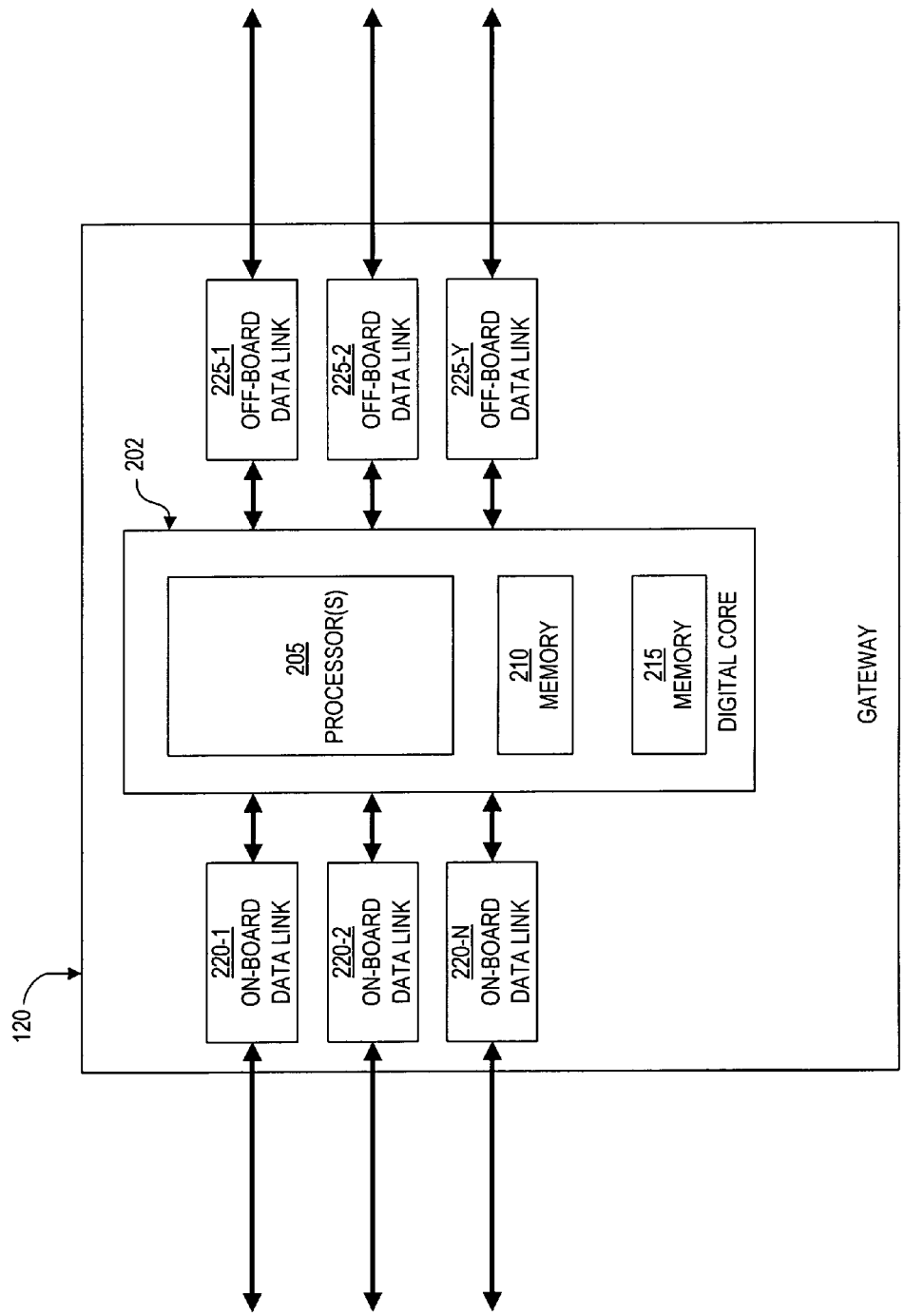
FIG. 2 is a block diagram of an exemplary gateway consistent with embodiments of the present invention.

In one embodiment, gateway 120 may include various computing components used to perform server based services (e.g., communications services, file services, database services, etc.) for on-board system 110. FIG. 2 shows an exemplary block diagram of gateway 120 consistent with embodiments of the present invention. As shown, gateway 120 includes a digital core 202, on-board data link port components 220-1 to 220-N, and off-board data link port components 225-1 to 225-Y.

Digital core 202 includes the logic and processing components used by gateway 120 to perform its interface, communications, and server functionalities. In one embodiment, digital core 202 includes one or more processors 205 and internal memories 210 and 215. Processor 205 may represent one or more microprocessors that execute software to perform the gateway features of the present invention. Memory 210 may represent one or more memory devices that temporarily store data, instructions, and executable code, or any combination thereof, used by processor 205. Memory 215 may represent one or more memory devices that store data temporarily during operation of gateway 120, such as a cache memory, register devices, buffers, queuing memory devices, and any type of memory device that maintains information. Memories 210 and 215 may be any type of memory device, such as flash memory, Static Random Access Memory (SRAM), and battery backed non-volatile memory devices.

On-board data link ports 220-1 to 220-N represent one or more interface devices that interconnect one or more on-board data links with digital core 202. For example, on-board data link ports 220-1 to 220-N may connect to proprietary and non-proprietary data links 128, 129, respectively. In one embodiment, on-board data link ports 220-1 to 220-N interfaces with one or more proprietary data links, one or more CAN data links (e.g., J1939, galvanized isolated CAN data links, etc.), one or more RS-232 serial based data links (e.g., MODBUS, PPP, NMEA183, etc.), and one or more RS-242 data links. On-board data link ports 220-1 to 220-N may also include virtual (i.e., software) ports that allow a single connection to act as if there were multiple connections.

Off-board data link ports 225-1 to 225-Y represent one or more interface devices that interconnect one or more off-board data links with digital core 202. For example, off-board data link ports 225-1 to 225-Y may connect gateway 120 to one or more RS-232 data links, RS-485 data links, Ethernet data links, MODBUS data links, radio data links, and/or satellite data links, etc. It is appreciated that gateway 120 may be configured to interface with any type of data link used in an on-board or off-board system network.

The gateway 120 shown in FIG. 2 is exemplary and not intended to be limiting. A number of additional components may be included in gateway 120 that supplement and/or compliment the operations of digital core 202 and data link ports 220 and 225. For example, gateway 120 may also include an internal power supply, a real time clock, hour meter, sensor inputs for receiving signals from one or more sensors monitoring the operations of a work machine component, memory arrays, etc. Moreover, as mentioned above, gateway 120 may, in certain embodiments, be implemented (e.g., via logic and/or circuitry) within one or more modules coupled to a given network.

Figure 3:
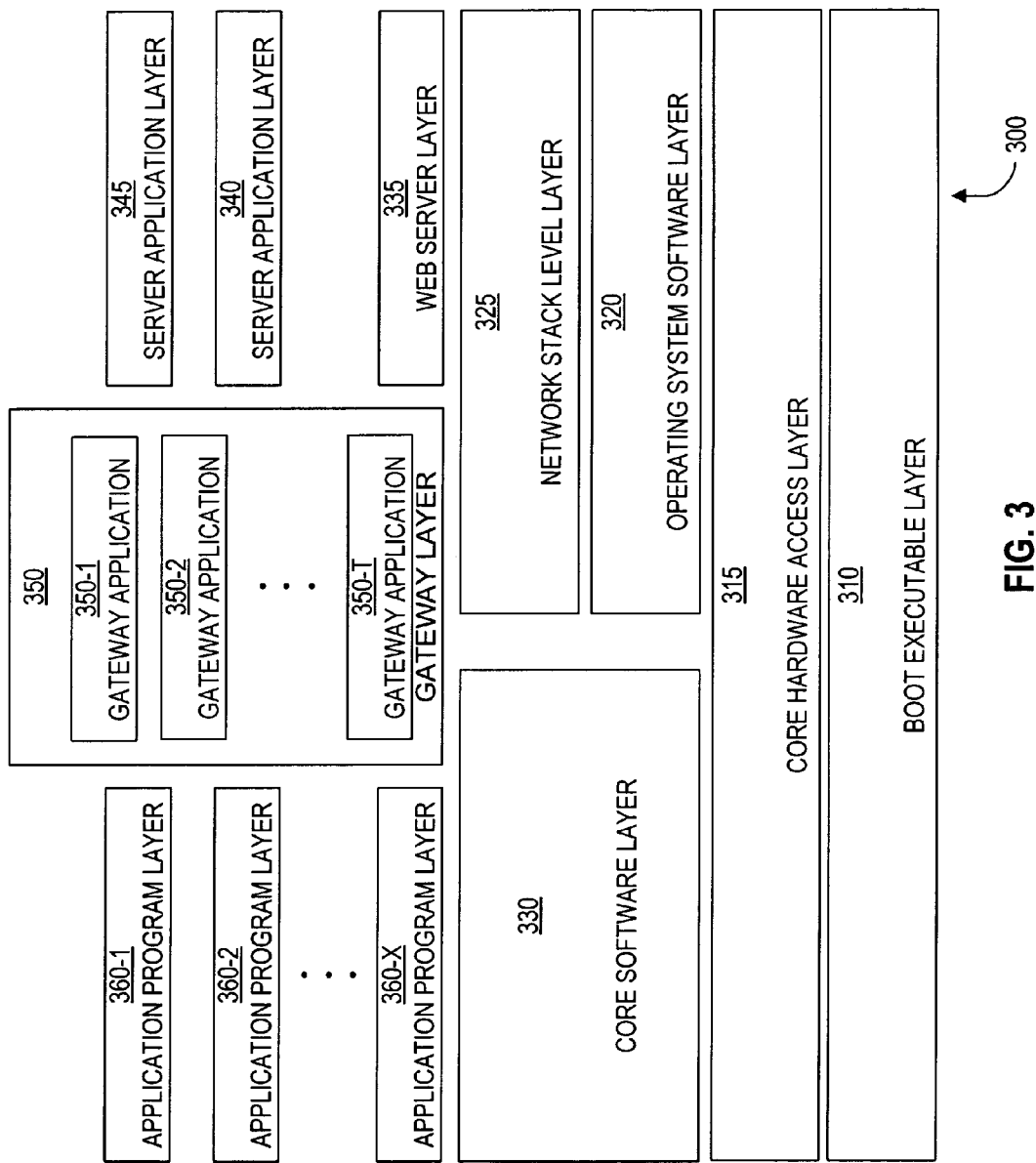
FIG. 3 is a block diagram of an exemplary software architecture for a gateway consistent with embodiments of the present invention.

In operation, digital core 202 executes program code to facilitate communications between on-board modules and/or off-board systems. In one embodiment of the present invention, memory 210 includes application and server-based software programs that allow information received through either data link ports 220 and 225 to be processed and/or transferred to the proper destination module/system in the proper format. FIG. 3 illustrates an exemplary software architecture model 300 that may be implemented by gateway 120 consistent with embodiments of the present invention.

Exemplary model 300 may include hardware interface software, such as boot executable software and driver software layer 310, that drive the on-board and off-board data link ports 220 and 225 connecting the multiple types of data links to gateway 120 (e.g., Ethernet, RS-232, CAN, proprietary data links, etc.). A core hardware access layer 315 interfaces boot executable layer 310 and core software layer 330, which includes software associated with runtime operations of gateway 120. Layer 320 includes operating system software executed by processor 205, and layer 325 is a network stack level including one or more protocol stacks used to perform communication services, such as formatting data messages for specific protocols, etc. In one embodiment, model 300 may also include a Web server layer 335 that includes server software used by gateway 120 to perform Web server operations, such as HTML processing, content generation, Web page request processing, etc. Further, model 300 may also include one or more layers 340-360 representing application programs executable by gateway 120. For example, layers 340, 345 may represent server applications executed by gateway 120 to perform certain services, such as data provisioning, application management, traffic management, etc. Layers 360-1 to 360-X may represent application programs that perform operations associated with functions typically performed by certain types of on-board modules connected to an on-board network, such as a Customer Communication Module (CCM), a communication adapter, a GPS Interface Module (GPSIM), a third party interface software, an Engine Vision Interface Module (EVIM), and a product link module.

Model 300 may also include an inter-data link gateway layer 350 that includes one or more gateway applications 350-1 to 350-T, that perform protocol conversion operations for converting information associated with one type of data link to another. The conversion operations may include protocol translation and tunneling features. Processor 205 may execute a selected one of application programs 350-1 to 350-T based on the type of format required by an outgoing data link. For example, application layer 350-1 may represent a protocol conversion program that allows data messages received in a proprietary data link to be converted to a J1939 format for transmission across a J1939 data link. Other types of conversion applications may be configured in model 300 including application layers that combine one or more protocol conversion capabilities.

Protocol Conversion Operations

Consistent with embodiments the present invention, methods and systems may leverage one or more gateways 120 in order to perform various protocol conversions. In these embodiments, gateway 120 may include hardware, firmware, and/or software (e.g., inter-data link gateway applications 350-1 to 350-T) for translating information among and between data link protocols and tunneling information over data link protocols. With such capabilities, gateway 120 may in certain embodiments operate as a bridge, access point, and/or repeater, extending the useable range of data links between various devices.

Tunneling

Consistent with embodiments of the present invention, methods and systems may facilitate information exchange among and between a plurality of different data link protocols. In such embodiments, methods and systems may leverage one or more gateways 120 to perform protocol tunneling. As used herein, the term "tunneling" refers to encapsulating information from one data link protocol within transmission units associated with another data link protocol. Tunneling may therefore enable data of one data link to be transmitted over a different physical layer. Tunneling operations may, in certain embodiments, enable modules operating with a first protocol to communicate via one or more data links incompatible with the first protocol. In certain embodiments, gateway 120 may include hardware, firmware, and/or software for performing tunneling processes. For example, as described above, model 300 may include an inter-data link gateway layer 350, including one or more gateway applications 350-1 to 350-T that perform tunneling processes.

As mentioned above, gateway 120 may encapsulate messages of a first protocol within a message consistent with one or more other data link protocols. Non-limiting examples of protocols with which tunneling may be used include: J1939, ISO11783, RS-422, ATA, CANOpen, TCP/IP, Ethernet, and a proprietary data link (PDL). In one example, gateway 120 may tunnel PDL messages (i.e., the passenger protocol) over J1939 and/or Ethernet data links (i.e., the encapsulating protocol). Additionally, or alternatively, gateway 120 may encapsulate PDL, J1939, ISO11783, ATA, CANOpen, and other protocols into TCP/IP messages to communicate over the Internet. Gateway 120 may also tunnel Internet Protocol (IP) packets over a J1939 data link. In certain embodiments, gateway 120 may tunnel messages from multiple and different data links simultaneously over another single data link. Gateway 120 may also receive messages from one data link and simultaneously tunnel information out on multiple and different data links. Consistent with embodiments of the present invention, each of application programs 350-1 to 350-T, included in gateway 120, may represent a distinct protocol conversion program. For example, application layer 350-1 may represent a protocol conversion program that allows data messages received in a PDL to be encapsulated for transmission across a J1939 data link.

Figure 4:
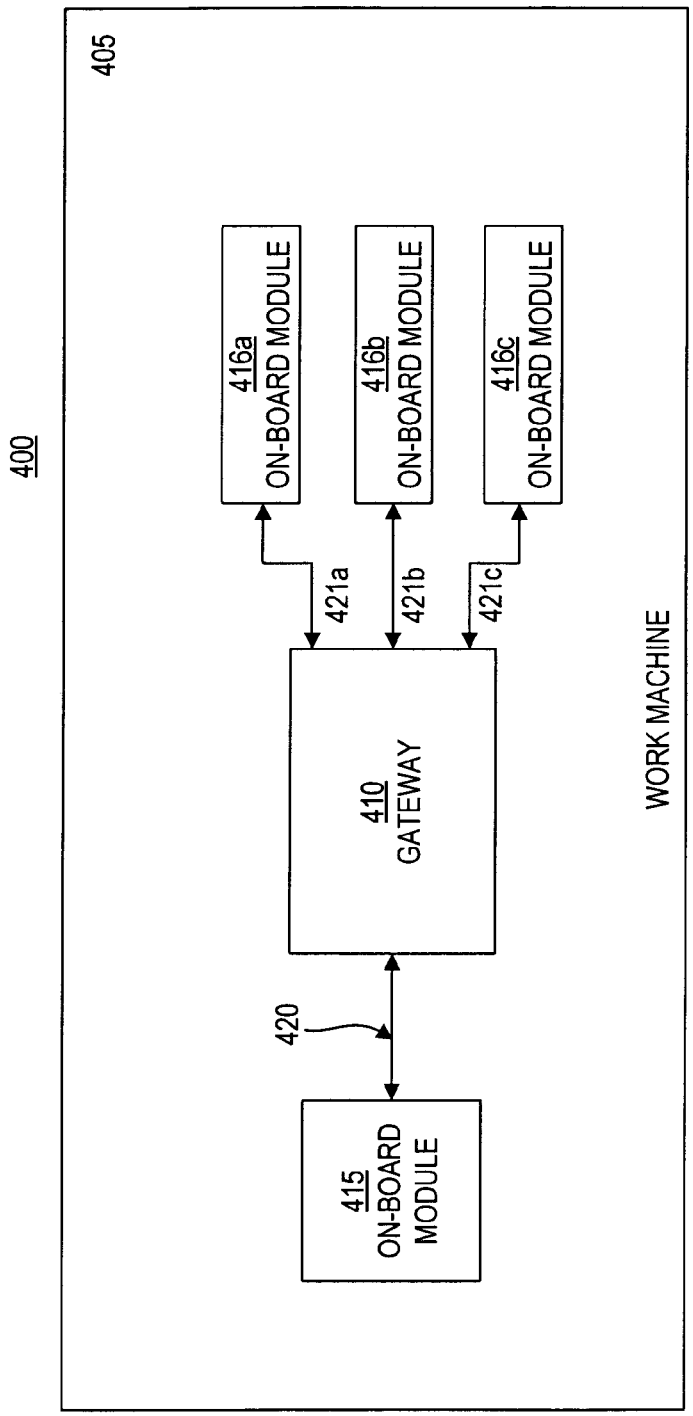
FIG. 4 is a block diagram of an exemplary on-board environment in which tunneling processes may be implemented, consistent with embodiments of the present invention.

Consistent with embodiments of the present invention, methods and systems may perform tunneling operations in an "on-board" environment or system. That is, information may be tunneled among and between data links within a given work machine. FIG. 4 is a block diagram of an on-board system 400 associated with a work machine 405, either fixed or mobile, consistent with certain embodiments of the present invention. As shown, work machine 405 may include a gateway 410, which may be similar in configuration and operation as gateway 120 described above in connection with FIGS. 1 and 2. Further, work machine 405 may include one or more on-board modules connected to one or more data links. For example, as illustrated in FIG. 4, a module 415 may be coupled to a data link 420; and modules 416a, 416b, and 416c may be coupled to data links 421a, 421b, and 421c, respectively. As illustrated, gateway 410 may be interposed between data link 420 and data links 421a-421c. Modules 415 and 416a-416c may include any type of on-board module, component, or sub-component operating within work machine 405 and may be connected to one or more proprietary and/or non-proprietary data links. For example, modules 415 and 416a-c may be ECMs, J1939 display devices (e.g., sensor gauges, etc.), EVIMs, on-board diagnostic systems, etc. The illustrated modules could also represent components and systems associated with work machine 405 such as propulsion, communications, and navigation systems. Data links 420, 421a, 421b, and 421c may be proprietary and/or non-proprietary data links similar to data links 128 and 129 described in connection with FIG. 1.

Figure 5:
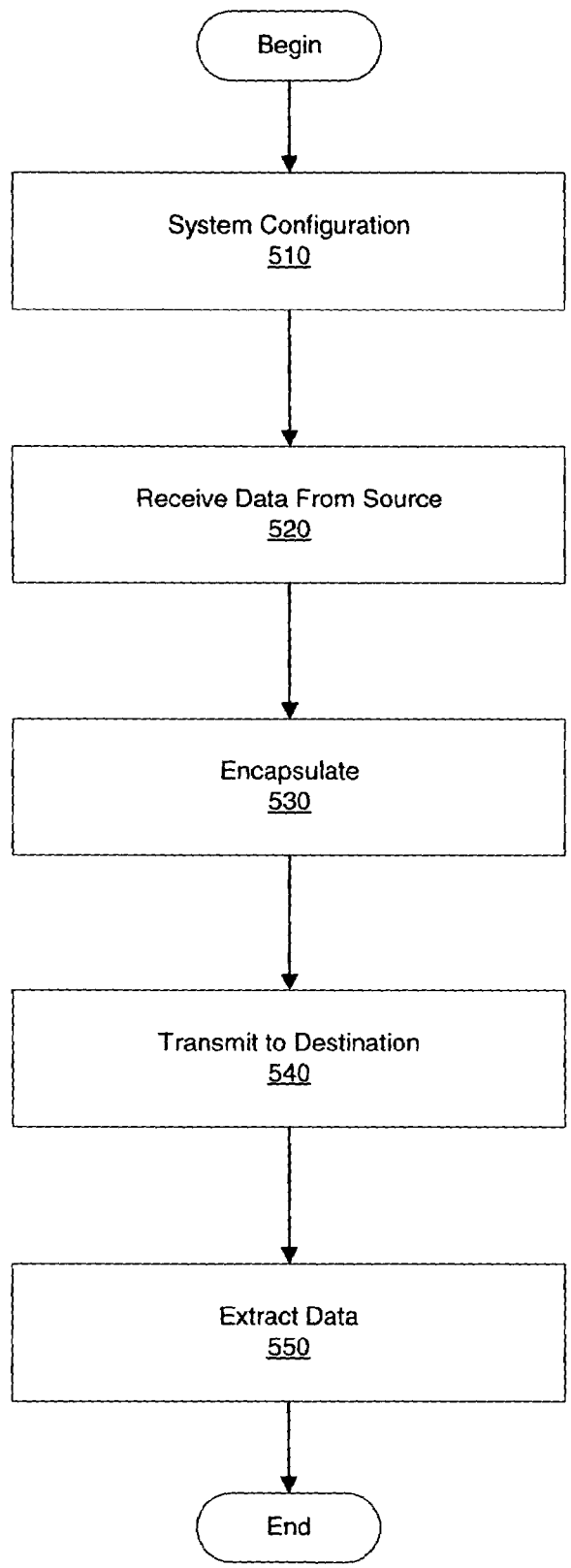
FIG. 5 is a flowchart depicting an exemplary tunneling process consistent with embodiments of the present invention.

FIG. 5 is a flowchart depicting an exemplary on-board tunneling process consistent with embodiments of the present invention. The illustrated process may begin with configuring system 400 (Step 510). Configuring the system may include configuring gateway 410. In certain embodiments, gateway 410 may be configured to perform specific tunneling processes. For example, gateway 410 may be configured to utilize application layer 350-1 to tunnel messages received from a PDL across a J1939 data link. Specific tunneling applications may be selected based on the types of protocols used in a given work machine. In one example, gateway 410 may also be configured with specific encryption/decryption algorithms. In certain embodiments, configuring the system (Step 510) may include installing, connecting, configuring, and/or associating with gateway 410 modules 415 and 416a-c. For example, one or more modules may be configured to serve as tunnel exit points. That is, certain modules may be aware that messages received from gateway 410 are encapsulated, and these modules may be configured to unwrap the messages upon receipt. The configuring stage may also involve setting parameters associated with tunneling, such as timing, priority, and/or error handling parameters.

Once the gateway and modules in work machine 405 are appropriately configured, data may be received in a first protocol (the passenger protocol) from one or more on-board sources (Step 520). For example, module 415 (e.g., an ECM) may send a PDL message destined for module 416a to gateway 410 over data link 420 (e.g., a PDL). In this fashion, modules 415 and 416a may serve as source and destination modules, respectively. In certain embodiments, module 415 may identify the message as a public or private message by programming an ID portion of the message with an identifier designating the message as either private or public. A public message is one that is accessible to non-proprietary systems and components, such as on-board system control module 127 shown in FIG. 1. A private message is one that is directed to components within an on-board proprietary network. For example, any message identifier within an exemplary range of values (e.g., 0-1000) may be considered public, while identifiers having values within another range (e.g., 1001-2000) may be private.

Upon receiving the message in the first (i.e., passenger) protocol from a source, gateway 410 may encapsulate the message within a transmission unit/format (the encapsulating protocol) consistent with the data link (e.g., data link 421a) to which the destination is coupled (Step 530). For example, data link 421a (coupled to module 416a) may be a J1939 data link, and gateway 410 may therefore encapsulate the received message within an J1939 transmission unit. In this fashion, gateway 410 may serve as a tunnel entry point. In certain embodiments, gateway 410 may also encrypt the message. In certain embodiments, gateway 410 may be pre-configured (e.g., at step 510) to encapsulate messages received from a particular data link or module in a specific protocol. In alternative embodiments, gateway 410 may be configured to discover that a message needs to be tunneled. That is, upon receiving a message from module 415, for example, gateway 410 may dynamically determine that the received message protocol is not compatible with the data link to which the destination module (e.g., 416a) of the message is coupled. For example, gateway 410 may learn that data links 420 and 421a are incompatible and therefore tunnel all data traffic that is received from data link 420 and destined for data link 421a. Gateway 410 may also analyze an identifier (e.g., a destination address) in a received message to determine whether it should tunnel the message in a second protocol. Once a message is encapsulated, gateway 410 may transmit the message to the destination (e.g., module 416a) via the data link coupled to the destination (e.g., data link 421a) (Step 540). In this fashion, gateway 410 may transmit the passenger protocol message across a data link via the encapsulating protocol.

In the process of FIG. 5, one or more destination modules may receive tunneled messages. For example, destination module 416a may receive the encapsulated message from data link 421a. Upon receiving an encapsulated message, the destination module may extract (i.e., unwrap) the message (Step 550). That is, the destination module may extract the passenger message from the encapsulating protocol. Module 416a may, for instance, extract PDL data from a J1939 message received from data link 421a. Consistent with principles of the present invention, the destination module may be configured to process the extracted message. For example, module 416a may extract PDL messages from J1939 transmission units and process the PDL data. In this fashion, tunneling processes consistent with the illustrated process of FIG. 5 may enable modules that operate with a first protocol to receive messages from an incompatible data link protocol.

Although the process concerning FIGS. 4 and 5 refers to tunneling a message from a single module to another single module, methods and systems consistent with the present invention may perform tunneling operations for multiple and different data links, both discretely and simultaneously. For example, gateway 410 may receive one or more messages in a first protocol (e.g., from data link 420) and discretely or simultaneously encapsulate the message(s) in multiple and different messages for transmission over different data links (e.g., 421a, 421b, and 421c). In addition, gateway 410 may receive messages from multiple data links (e.g., PDL, J1939, CANOpen, and ISO11783) and, discretely or simultaneously, encapsulate the messages in a single protocol (e.g., RS-422).

Figure 6:
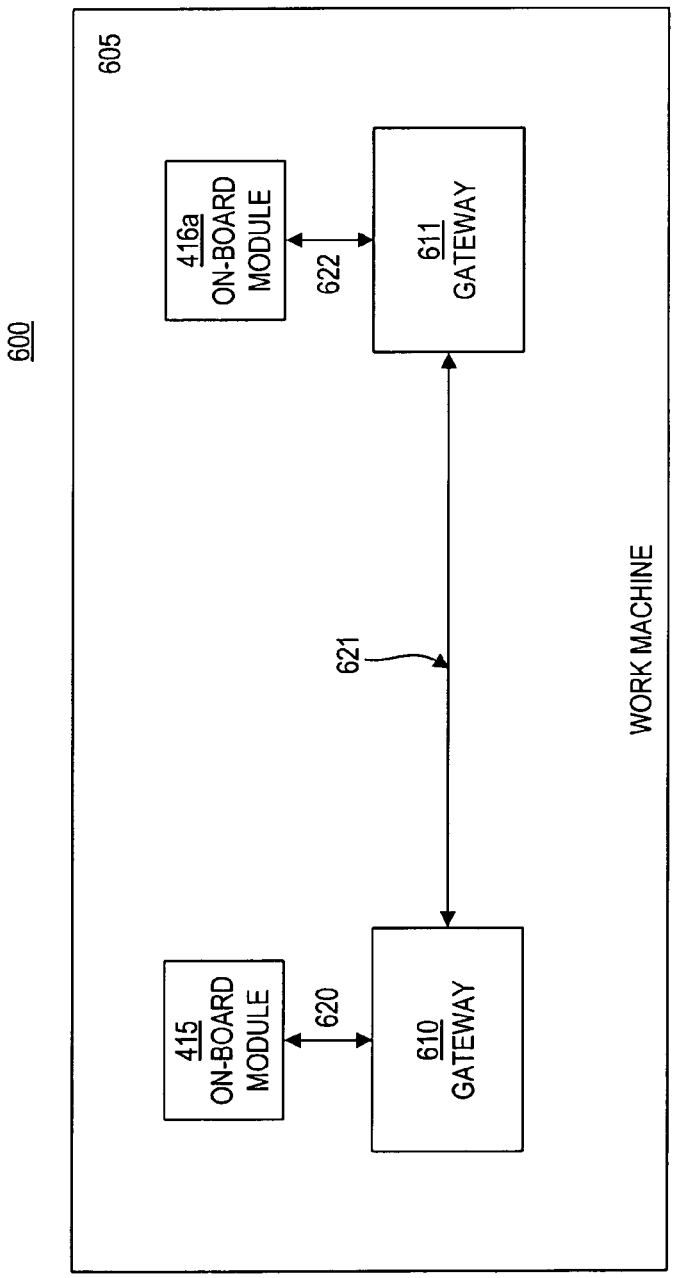
FIG. 6 is a block diagram of another exemplary environment in which tunneling processes may be implemented consistent with embodiments of the present invention.

In certain embodiments of the present invention, a plurality of gateways may be included in an on-board system to facilitate tunneling. FIG. 6 is a block diagram of an on-board system 600 associated with a work machine 605 in which multiple gateways are leveraged. As shown, work machine 605 may include a gateways 610 and 611, which may be similar in configuration and operation as gateway 120 described above in connection with FIGS. 1 and 2. In the illustrated system, gateways 610 and 611 may serve as tunnel entry and exit points, respectively. Gateways 610 and 611 may be coupled via a data link 621. Further, work machine 605 may include one or more on-board modules connected to one or more data links. For example, as illustrated, module 415 may be coupled to a data link 620, and module 416a may be coupled to a data link 622. Data links 620, 621, and 622 may be any type of proprietary and/or non-proprietary data links. In one example, work machine 605 may be a vessel, with gateway 610 and module 415 located in an engine room and gateway 611 and module 416a located in a pilot room.

Figure 7:
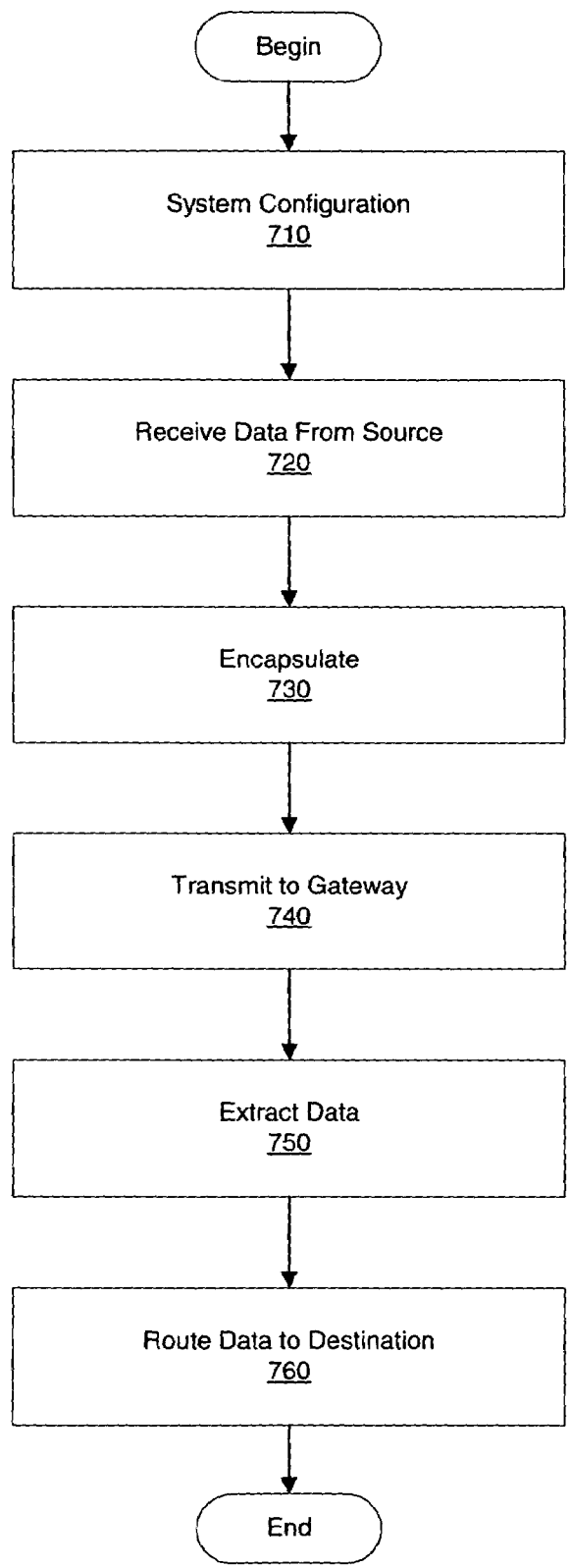
FIG. 7 is a flowchart depicting another exemplary tunneling process consistent with embodiments of the present invention.

FIG. 7 is a flowchart depicting an exemplary on-board tunneling process in which multiple gateways are leveraged consistent with embodiments of the present invention. The illustrated process may include similar steps as described above in connection with FIG. 5. For example, steps 710-730 may parallel steps 510-530. After encapsulating a message received from a source (Step 730), however, the process of FIG. 7 may include transmitting the message from gateway 610 via the encapsulating protocol to gateway 611 via data link 621 (Step 740). Gateway 610 and 611 may be pre-configured to serve as tunnel entry and exit points such that messages received by gateway 610 from source modules are tunneled through gateway 611 to destination modules. Upon receiving the encapsulated message, gateway 611 may extract the passenger message from the encapsulating protocol (Step 750). At this stage, gateway 611 may route the message to one or more destination modules (Step 760). For example, gateway 611 may route the original message to module 416a across data link 622 (e.g., a PDL). In alternative embodiments, module 416a may be configured to unwrap the encapsulated message, and gateway 611 may simply route the encapsulated message from data link 621 to module 416a.

In certain embodiments, tunneling processes implemented in system 600 may enable information exchange among a plurality of different data links. For example, data links 620, 621, and 622 may each use a different protocol. In such scenarios, gateway 610 may tunnel messages received from module 415 across data link 621 to gateway 611. Upon receiving the encapsulated message, gateway 611 may tunnel the encapsulated message to module 416a, where the original message is extracted.

Figure 8:
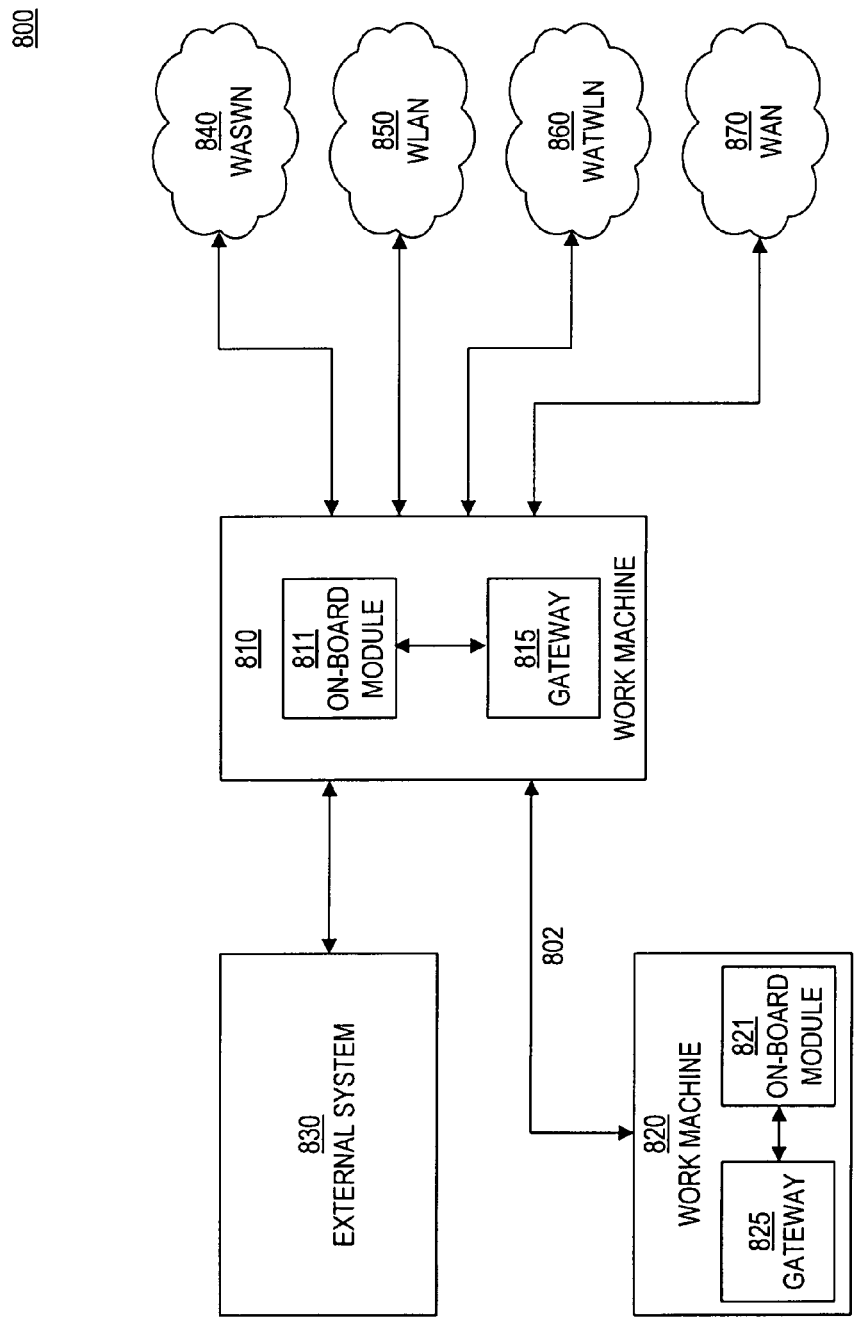
FIG. 8 is a block diagram of an exemplary off-board environment in which tunneling processes consistent with embodiments of the present invention may be implemented.

In addition, or as an alternative, to on-board tunneling, methods and systems consistent with the present invention may perform off-board tunneling. FIG. 8 is a block diagram of an exemplary off-board environment consistent with embodiments of the present invention.

As shown in FIG. 8, a work machine 810 may include a gateway 815, which may be configured, and operates, similarly to gateway 120 described in connection with FIGS. 1 and 2. Work machine 810, which may be mobile or fixed, may also include one or more modules 811, which may be similar to modules 415 and 416a-c. Gateway 815 may execute one or more server applications that allow work machine 810 to communicate, share, and/or process information with one or more off-board elements, such as one or more other work machines 820, one or more external systems 830, and/or one or more external networks such as a Wide Area Satellite Wireless Network (WASWN) 840, a Wireless Local Area Network (WLAN) 850, a Wide-Area Terrestrial Wireless Network (WATWLN) 860, and/or a Wide Area Network (WAN) 870.

WASWN 840 may be a satellite radio network that includes infrastructure allowing communications between one or more satellite devices and a remote system, such as computer system 140 described in connection with FIG. 1. WLAN 850 may be a wireless radio network including infrastructure that facilitates communications between one or more wireless radio devices and a remote system, such as computer system 140. WATWLN 860 may be a wireless network that includes infrastructure allowing communications between one or more cellular devices and a remote system (e.g., computer system 140). WAN 870 may be a network including infrastructure that allows for Internet access, such as the World Wide Web.

As illustrated, work machine 820 may include a gateway 825 that may be configured and operates similar to gateway 120. Work machine 820 may also include one or more modules 821, which may be similar to modules 415 and 416a-c. Work machine 820 may be a mobile or fixed work machine connected to work machine 810 through a wireline or wireless data link 802. External system 830 may represent a remote system that communicates with gateway 815 through a wireless or wireline connection, such as computer system 130, computer system 140, or service port system 150.

Although FIG. 8 shows work machine 820 and external system 830 connected to work machine 810 through dedicated data links, these elements may also be configured to communicate with gateway 815 through one or more of networks 840, 850, 860, and 870.

In the illustrated off-board environment of FIG. 8, gateway 815 may tunnel messages from one or more modules within work machine 810 to one or more off-board elements. For example, module 811 in work machine 810 may need to transmit information to module 821 in work machine 820. In such situations, gateways 815 and 825 may be configured as tunnel entry and exit points, respectively. That is, gateway 815 may received a message destined for module 821 from module 811, encapsulate the message in a transmission unit consistent with data link 802, and transmit the encapsulated message across data link 802 to work machine 820. Upon receiving the encapsulated message, work machine 820 may route the message to gateway 825, where it is then unwrapped and routed to module 821.

In certain embodiments consistent with the present invention, gateway 815 may be configured to encapsulate messages (originating from modules within work machine 810) within network packets for transmission across one or more networks. For example, gateway 815 may encapsulate PDL, J1939, CANopen, ISO11783, and other protocol data within TCP/IP messages for transmission across the Internet (e.g., via network 870). In addition, gateway 815 may be configured to tunnel IP packets across one or more data links within work machine 810. For example, gateway 815 may tunnel IP packets received from network 870 over a J1939 and/or an ISO11783 data link coupled to module 811 within work machine 810.

As mentioned above, tunneling operations may be performed for multiple and different data links, both discretely and simultaneously. Accordingly, gateway 815 may tunnel messages received from a plurality of off-board elements (e.g., network 870, work machine 820, external system 830) across one or more data links to destinations within work machine 810. In addition, gateway 815 may tunnel messages received from a plurality of different data links within work machine 810 across one or more data links coupled to an off-board element. For example, gateway 815 may encapsulate data received from PDL, J1939, CANopen, and ISO11783 data links within TCP/IP messages for transmission across the Internet (e.g., via network 870).

Translating

Consistent with embodiments of the present invention, methods and systems may leverage one or more gateways 120 to perform protocol translation in order to facilitate communications between different data links, whether on-board or off-board. As used herein, the term "translating" refers to converting messages from one data link protocol into comparable messages of another protocol. In exemplary translation processes consistent with the present invention, protocol-specific parameters may be translated between different data links. Such parameters may include operational parameters, such as engine speed, injection rates, component and/or area temperatures, pressures, etc. corresponding to systems, modules and components located in a work machine environment. Further, parameters may include, or be associated with, engine diagnostic and performance parameters associated with an ECM. Parameters may also reflect commands or be used to perform certain actions. Messages from modules in a work machine environment may include one or more commands to adjust one or more parameter data values based on, for example, a requested action directed to a work machine. In one instance, a message may include a request to increase engine speed of a particular work machine by adjusting (or requesting adjustment of) data values associated with an engine speed parameter.

Translating differs from tunneling in that the messages from one data link protocol are converted into comparable messages of another protocol before they are sent. That is, messages are not encapsulated into the physical layer of another protocol, as is done with tunneling. Consistent with principles of the present invention, translating may be performed among and between any number of protocols. Messages from multiple and different data links may be discretely or simultaneously translated and sent out on a single data link. Messages may also be received from a single data link and discretely or simultaneously translated and sent out over multiple and different data links. Consistent with certain embodiments of the present invention, translation processes may also include encrypting and/or decrypting data link traffic. Non-limiting examples of translations include: (1) PDL and J1939 to MODBUS; (2) PDL to ISO11783; (3) PDL to J1939; (4) ATA to J1939; and vice versa. In certain embodiments, gateway 120 may include hardware, firmware, and/or software for performing translation processes. For example, model 300 may include an inter-data link gateway layer 350, including one or more gateway applications 350-1 to 350-T that perform translation processes.

Consistent with principles of the present invention, a translation data structure, such as a translation table, that maps parameters between data links may facilitate protocol translation. Gateway 120 may access such a table in order to perform translation operations. FIG. 9 illustrates an exemplary translation table 910 consistent with embodiments of the present invention. In certain embodiments, translation table 910 may be stored in a memory device within gateway 120 and accessed using one or more processing devices, such as a memory controller or a CPU device. Alternatively, translation table 910 may reside external to gateway 120. As illustrated in FIG. 9, translation table 910 may include a plurality of parameter identifiers (PIDs) representing system parameters associated with various data link protocols. For example, PID 1 may represent an engine speed (RPM) parameter associated with certain protocols. PID 2 may, as illustrated, represent a temperature parameter. Table 910 may include any number (R) of different PIDs.

Consistent with principles of the present invention, table 910 may include one or more scaling factors, each representing a data link "view." Each view may correspond to a particular protocol interfaced by gateway 120. Table 910 includes four views: (1) a PDL view; (2) an Ethernet data link (i.e., Web) view; (3) a J1939 view; and (4) a RS-422 view. Although four views are shown, table 910 may include any number of views corresponding to data links interfaced by gateway 120. Each "view" may enable its associated data link to interpret parameter data stored in a universal storage location. Universal Storage (US) represents a memory location or locations that store one or more values corresponding to a particular parameter (i.e., parameter data). Parameter data may be received from one or more data links interfaced by gateway 120.

As illustrated in FIG. 9, each data link view may include a scale factor corresponding to translation logic used by gateway 120 to translate parameter data stored in the US to an appropriate format for the particular data link protocol. In certain embodiments, all views represented by translation table 910 may support a given parameter. For example, an RPM parameter (PID 1) may exist in all of the protocols mapped by translation table 910 (e.g., PDL, Web, J1939, and RS-422). However, in some cases, certain parameters may be supported by less than all of the views mapped by translation table 910. For example, the temperature parameter may be supported by PDL, Ethernet, and J1939 but not by RS-422. The scale factor for such non-supporting views may be null or set to zero.

In addition, each view in translation table 910 may include a specific read/write privilege to the Universal Storage. That is, certain data links may be assigned write privileges to the Universal Storage, while other data links have only read access.

Consistent with translating processes of the present invention, translation table 910 may be pre-configured with a plurality of parameter identifiers and scale factors corresponding to a plurality of data links interfaced by gateway 120. In operation, gateway 120 may receive a message, including a PID and corresponding parameter data, from a particular data link. In response to such a message, gateway 120 may extract the PID and store the parameter data in the US. In addition, gateway 120 may use the PID to scale the parameter data according to the scale factors included in translation table 910, thereby creating multiple "views" of the parameter data. In one example, gateway 120 may receive a request for parameter data from a particular data link. The request may include a PID corresponding to the requested data. In response to such a request, gateway 120 may extract the PID from the request and scale the requested parameter data (previously stored in the US) using a scale factor corresponding to the extracted PID and requesting data link protocol.

Figure 10:
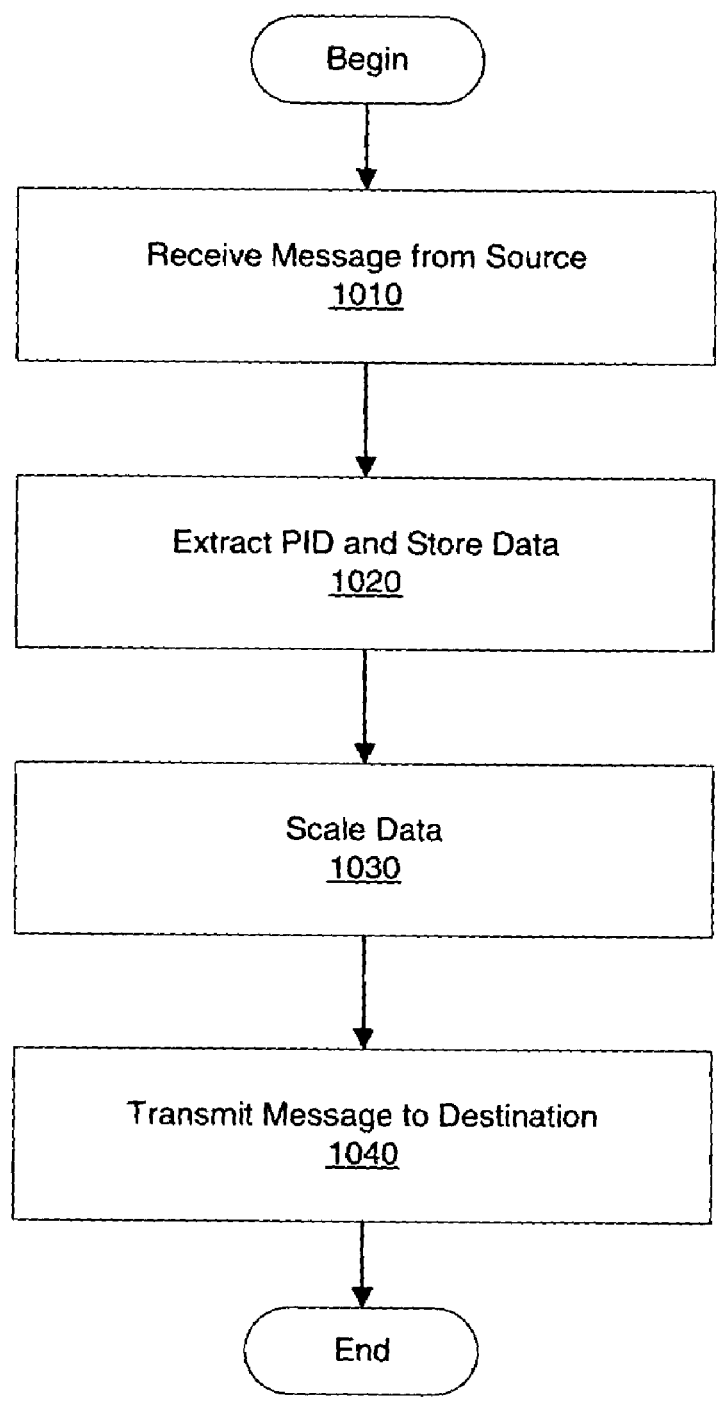
FIG. 10 is a flowchart depicting an exemplary translation process consistent with embodiments of the present invention.

FIG. 10 is a flowchart depicting an exemplary translation process consistent with embodiments of the present invention. The illustrated process may begin when gateway 120 receives a message from a source (Step 1010). For example, on-board control module 125 (e.g., an ECM) may provide gateway 120 with a PDL message destined for computer system 130, which in this example includes an Internet browser. The received message may include one or more parameters and associated parameter data. The received message may also indicate one or more destinations for the parameter data included in the message. In certain embodiments, the received message may serve to transmit parameter data from a source to a destination. In one example, module 125 may send gateway 120 a message (e.g., over proprietary data link 128) including a PID corresponding to engine speed (e.g., RPMs) and corresponding parameter data representing actual engine speed, such as 100 RPMs. The parameter data may be configured in a format consistent with the data link over which it is transmitted. For example, although the actual engine speed reported by module 125 may be 100 RPMs, the module may transmit information that is numerically (or textually, symbolically, etc.) different from the actual value, such as the value 200. Because other modules coupled to different data links may require the engine speed data, the parameter data needs to be appropriately translated for other protocols. Received messages may also reflect commands that instruct a destination system or module to perform an action, resulting in a change in the parameter data. For example, a message may be sent to an ECM to increase RPMs. In one embodiment, messages received from on-board systems may include a PID corresponding to the type of parameter that is being manipulated, sent, etc. in the message. In the above examples, the PID may reflect an RPM parameter.

Upon receiving the message from the source, gateway 120 may extract the PID from the message and store the corresponding parameter data (e.g., 200) in the Universal Storage location (Step 1020). As mentioned above, methods and systems consistent with the present invention may enable multiple and different data links to access data stored in the US. In one example, translation table 910 may allow various views (e.g., Web, J1939, PDL, etc.) to access the stored RPM data.

In the process of FIG. 10, gateway 120 may scale the parameter data in the received message from the source to conform with the destination protocol (Step 1030). For example, if the destination for the parameter value is a Web-based module, gateway 120 may use a scale factor from translation table 910 corresponding to the Web view. Gateway 120 may identify and select an appropriate scale factor based on the PID corresponding to the parameter data and destination protocol. For example, gateway 120 may scale RPM data for an Ethernet protocol by retrieving a scale factor that corresponds to the Web view and the RPM PID. Referring to the exemplary value depicted in FIG. 9, for the Web the RPM parameter data may be scaled by one-half (½) in order to retrieve the actual RPM value of 100. In another example, the RPM parameter data may be scaled by ten (10) in order to provide a J1939 module with the actual parameter data. That is, 2000 may correspond to an actual RPM value of 100 in the J1939 protocol.

After scaling the parameter value, gateway 120 may transmit (e.g., via a message) the scaled parameter value to its destination via the data link associated with the destination (Step 1040). For example, gateway 120 may transmit the scaled RPM parameter value to the Internet browser of system 130 via an Ethernet data link.

Although the process of FIG. 10 refers to specific source and destination modules, translation processes consistent with the present invention may enable multiple and different processes associated with various data links to access (discretely and simultaneously) data from the US location. For example, gateway 120 may receive RPM data periodically from an ECM, and a plurality of other modules may periodically access the data from gateway 120 via translation table 910. In such scenarios, gateway 120 could receive a request, including a particular PID, from a data link for a parameter value corresponding to the PID. In response to such a request, gateway 120 may use the received PID to select an appropriate scale factor for the requesting data link and provide that data link with access to the parameter data from the US. The gateway may, for example, send a message to the requesting data link that includes the scaled parameter data. Further, gateway 120 could be configured to translate and transmit parameter data to several modules, perhaps periodically. Additionally, a particular view may access information and provide feedback forming a closed loop operation. In one instance, a J1939 module may receive RPM data from gateway 120 and, in response, provide a command destined for a PDL-based ECM to increase engine speed. Such a command may be routed to gateway 120, where it is translated and sent to the ECM.

As described above, each data link view in translation table 910 may include its own read/write privileges to the Universal Storage. Thus, in the above example, the Web browser may not be permitted to overwrite the parameter value in the Universal Storage. To accommodate feedback from modules, translation table 910 may include multiple US locations corresponding to a given parameter and mapped to corresponding scale factors. For instance, if the Web browser receives parameter data from a first US location and then provides feedback, gateway 120 may store that feedback in a second US location associated with the parameter. The stored feedback may be then scaled to a format corresponding to the data link connected to original sending module. Gateway 120 may then send the scaled data to the on-board system component for processing. In one example, a PDL-based ECM may provide gateway 120 with fuel flow data. Gateway 120 may translate and route this parameter data to a diagnostic module via an Ethernet data link. Upon receipt, the diagnostic module may provide feedback to gateway which includes instructions to increase the fuel flow rate. This feedback may be stored in translation table 910, scaled, and transmitted back to the ECM for processing. In response to receiving the feedback, the ECM may increase the fuel flow rate in accord with the message from the diagnostic module.

Bridging

Consistent with embodiments of the present invention, systems and methods may leverage protocol conversion capabilities to perform bridging operations. In certain embodiments, one or more gateway 120s may use protocol conversion processes (e.g., tunneling) to facilitate bridging. As used herein, the term "bridging" refers to connecting one data link having a first protocol to another data link that may use the same protocol. That is, a "bridge" may connect consistent physical layers. However, in alternative embodiments, tunneling and/or translating processes consistent with principles of the present invention may be leveraged to "bridge" inconsistent physical layers. Consistent with principles of the present invention, information may be bridged from a first data link (e.g., a J1939 data link) over a second protocol (e.g., RS-422) to another data link consistent with the first (e.g., J1939). In this fashion, gateway 120 may extend the useable range of data links in a work machine or in a work machine environment. For instance, tunneling J1939 data over an RS-422 data link may allow the data to be transported over a distance that exceeds the range of the J1939 data link.

Figure 11:
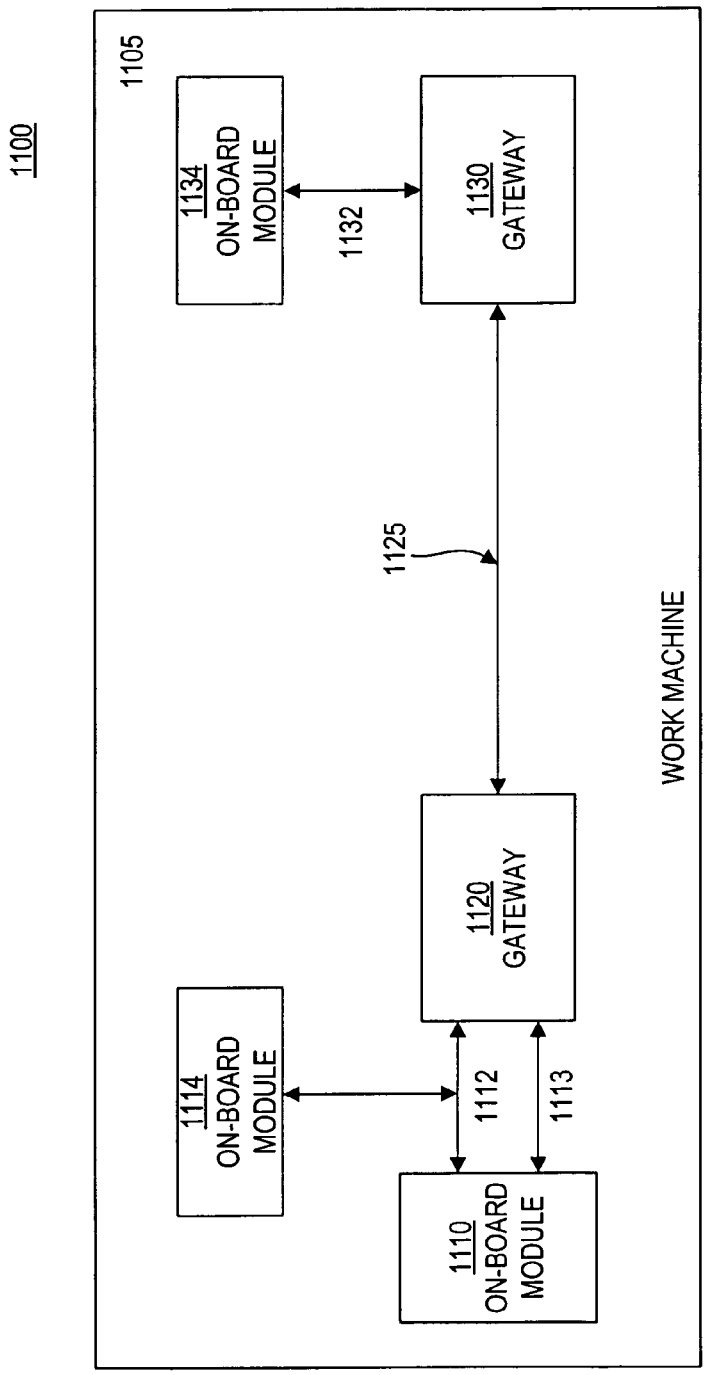
FIG. 11 is a block diagram of an exemplary environment in which bridging operations may be implemented, consistent with embodiments of the present invention.

FIG. 11 is a block diagram illustrating an exemplary on-board system 1100 in which bridging methods consistent with embodiments of the present invention may me implemented. As illustrated, a work machine 1105 in system 1100 may include a gateway 1120 and a gateway 1130, which may each be configured and operate similar to gateway 120 described earlier. A data link 1125 may be interposed between gateways 1120 and 1130. Data link 1125 may be any type of data link, such as an RS-422 data link. Gateway 1120 may be coupled to modules 1110 and 1114 via data links 1112 and 1113. Modules 1110 and 1114 could be any type of on-board modules. For example, module 1110 could be an engine and module 1114 could be a display device. Data link 1112 may, for example, be a J1939 data link, and data link 1113 may be a PDL. Gateway 1130 may, as illustrated, be coupled to a module 1134 via a data link 1132. Module 1134 may be a display device, and data link 1132 may be a J1939 data link. In one example, gateway 1120 and modules 1110 and 1114 may be located in an engine room while gateway 1130 and module 1134 are located in a pilot room of a marine machine or platform.

In system 1100, modules 1110, 1114, and 1134 may be J1939-based modules. However, the distance between module 1110 and 1134 may exceed the range of the J1939 protocol. For example, the distance between modules 1110 and 1134 may be approximately 200 meters, while the range of the J1939 data link may be only 40 meters. To accommodate such a scenario, gateways 1120 and 1130 may be configured to serve as a distance bridge between modules 1110 and 1114 and module 1134. Gateways 1120 and 1130 may be configured as bridge entry and exit points, respectively, and may be coupled together via data link 1125. Data link 1125 may have a range sufficient to accommodate the positioning of modules 1110, 1114, and 1134. For example, data link 1125 may be an RS-422 data link with a range of 300 meters.

Referring to FIG. 11, gateway 1120 may receive J1939 messages from module 1110 and encapsulate the message within an RS-422 transmission unit. The encapsulated message may be transmitted over the data link 1125 and received by gateway 1130, which may extract the passenger message and route it to module 1134 over data link 1132. In this fashion, gateways 1120 and 1130 serve as a J1939 distance bridge. In certain embodiments, gateway 1120 may also receive messages destined for module 1134 from data link 1113. In one example, however, data links 1113 and 1132 may be incompatible. For instance, data link 1113 may be a PDL, and data link 1132 may be a J1939 data link. To accommodate such scenarios, gateway 1120 may translate the message from data link 1113 (e.g., to J1939) and then encapsulate the translated message within a transmission unit compatible with data link 1125. Gateway 1130 may receive the message from data link 1125, extract the passenger (e.g., the original PDL message translated to J1939), and route the extracted message to module 1134 via data link 1132. In alternative embodiments, gateway 1120 may encapsulate the message received from data link 1113, and gateway 1130 may perform translation in order to route the message to module 1134. In addition, encapsulated messages may be unwrapped by destination modules instead of gateway 1130. Thus, gateways 1120 and 1130 may serve as distance bridge while messages are unwrapped by destination modules.

In certain embodiments, work machine 1105 may be a mobile work machine that monitors and controls multiple wireless on-board devices, such as radio transceivers. When mobile work machine 1105 moves into a certain range of second gateway-embedded work machine (e.g., mobile or fixed), gateway 1120 may send a message to the gateway embedded in the second work machine. The gateway in the second work machine may translate the message to another protocol for extended transmissions (e.g., an RS-422 data link from a base station that the second work machine approaches).

Although, in FIG. 11, gateways 120 and 1130 are located within work machine 1105, one or more gateways may be leveraged to bridge geographically dispersed modules and data links. For example, gateway 1120 may reside on one work machine while gateway 1130 resides in another remotely located work machine, system, or environment.

For additional clarity of explanation, the systems 100-400, 600, 800, and 1100 are described herein with reference to the discrete functional elements illustrated in FIGS. 1-4, 6, 8, and 11. However, it should be understood that the functionality of the illustrated elements and modules may overlap and/or may exist in a fewer or greater number of elements and modules. Elements of each system may, depending on the implementation, lack certain illustrated components and/or contain, or be coupled to, additional or varying components not shown. Moreover, all or part of the functionality of the illustrated elements may co-exist or be distributed among several geographically dispersed locations.

In addition, the steps illustrated in the flowcharts of FIGS. 5, 7, and 10 are consistent with exemplary implementations of the present invention. Further, it should be understood that the sequence of events described in FIGS. 5, 7, and 10 are exemplary and not intended to be limiting. Thus, other method steps may be used, and even with the methods depicted in FIGS. 5, 7, and 10, the particular order of events may vary without departing from the scope of the present invention.

Moreover, certain steps may not be present and additional steps may be implemented in FIGS. 5, 7, and 10. For example, in certain embodiments, translation, tunneling, and bridging processes consistent with embodiments of the present invention may include encrypting and/or decrypting data link traffic. In addition, it should be understood that the illustrated stages may be modified with departing from the scope of the present invention.

INDUSTRIAL APPLICABILITY

Consistent with embodiments of the present invention, methods and systems may facilitate information exchange in multi-protocol environments. In one example, a work machine may include a plurality of different data links and corresponding modules. Systems and methods of the present invention may enable these modules to exchange information, despite incompatibilities among their respective operating protocols. Consistent with principles of the present invention, methods and systems may leverage one or more gateways to perform protocol conversion processes, such as tunneling and translating. In addition, such processes may be exploited to provide features such as distance bridging. In certain embodiments, one or more gateways may be configured to perform one of tunneling, translating, or bridging. In other embodiments, one or more gateways may perform tunneling, translating, and bridging operations. In one example, a single gateway may perform tunneling, translating, and bridging operations for one or more interfaced data links.

In one embodiment, one or more gateways may be configured to encapsulate information from a first protocol within transmission units of a second protocol. In this fashion, systems and methods consistent with the present invention may tunnel messages originating from one or more modules and formatted in a first protocol through a second data link protocol to one or more destinations.

In certain embodiments consistent with the present invention, one or more gateways may be configured to translate parameters between incompatible protocols. Systems and methods of the present invention may convert parameters associated with a first protocol into comparable parameters associated with a second protocol. A translation table may facilitate such protocol translation processes.

Consistent with certain embodiments of the present invention, systems and methods may perform tunneling and translating operations concurrently. Additionally, one or more gateways may be configured to tunnel information through one data link and translate information for another. Further, in certain embodiments, one or more gateways may encrypt and decrypt data link traffic in addition to performing tunneling, translating, and/or bridging.

In some work machine environments, components may be located at substantial distances from each other. For example, on a marine vessel, an ECM may be located in an engine room and a display may be located several hundred meters away in a pilot room. In such environments, however, the protocols with which the modules operate may be unable to communicate information over such distances. That is, the distance between certain modules may exceed the range of the data link protocols with which these modules operate. To accommodate such situations, methods and systems of the present invention may, leveraging one or more embedded gateways, provide bridging operations in order to extend the useable range of certain protocols.

Systems and methods consistent with the present invention may serve to adapt legacy systems and applications to new technology. For example, certain work machines may include multi-protocol operating environments but may include legacy ECMs not compatible with all of the implemented protocols. In some instances, it may be desirable to maintain these legacy systems despite their incompatibility with newer protocols. Methods and systems consistent with the present invention may enable such legacy systems to interact with other systems and applications that operate with incompatible physical layers. That is, the present invention may enable legacy systems to operate with newer systems and other protocols not compatible with the legacy protocol.

The embodiments, features, aspects and principles of the present invention may be implemented in various environments and are not limited to work site environments. For example, a work machine with an embedded gateway may perform the functions described herein in other environments, such as mobile environments between job sites, geographical locations and settings. Further, the processes disclosed herein are not inherently related to any particular system, and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for translating messages in a multi-protocol environment, the method comprising:
   receiving, by a gateway onboard a machine, a first message from a module onboard the machine in a first data link protocol used by the onboard module, the message including a first parameter identifier, and a second message from a module off-board the machine in a second data link protocol used by the off-board module, the message including a second parameter identifier;
   determining, by the gateway, whether the first parameter identifier and the second parameter identifier match corresponding parameter identifiers included in a translation table associated with the gateway;
   scaling a first parameter value contained in the first message to a parameter value consistent with the second data link protocol using a scale factor associated with the matched first parameter identifier, and a second parameter value contained in the second message to a parameter value consistent with the first data link protocol using a scale factor associated with the matched second parameter identifier; and
   sending a third message including the scaled first parameter value consistent with the second data link protocol to the off-board module using the second data link protocol, and a fourth message including the scaled second parameter value consistent with the first data link protocol to the onboard module using the first data link protocol.

2. The method of claim 1, wherein the first data link protocol is a proprietary data link protocol.

3. The method of claim 1, wherein the second data link protocol is a non-proprietary protocol including one of a J1939 protocol, a CAN protocol, a MODBUS protocol, a serial standard data link protocol, and an Ethernet protocol.

4. A system for exchanging information in a multi-protocol environment, the system comprising:
   a translation table implemented in a memory device, the translation table including:
      at least one parameter identifier,
      a plurality of scale factors associated with the at least one parameter identifier, wherein each of the plurality of scale factors corresponds to a different data link protocol, and
      a universal storage section for storing a parameter value associated with the at least one parameter identifier; and
   a gateway residing onboard a machine and configured to access the translation table, wherein the gateway is configured to:
      receive a first message from a module onboard the machine including a first parameter identifier and a first parameter value via a first data link used by the onboard module, and a second message from a module off-board the machine including a second parameter identifier and a second parameter value via a second data link used by the off-board module;
      determine whether the first parameter identifier and the second parameter identifier match the at least one parameter identifier in the translation table;
      when a match is found by the gateway, scale the first parameter value to a value compatible with the second data link, and scale the second parameter value to a value compatible with the first data link, using the scale factor corresponding to the matched parameter identifier; and
      output a third message containing the scaled first parameter value compatible with the second data link to the off-board module via the second data link, and a fourth message containing the scaled second parameter compatible with the first data link protocol to the on-board module via the first data link.

5. The system of claim 4, wherein the first data link protocol is a proprietary data link protocol.

6. The system of claim 4, wherein the first data link protocol is a non-proprietary protocol including one of a J1939 protocol, a CAN protocol, a MODBUS protocol, a serial standard data link protocol, and an Ethernet protocol.

7. The system of claim 4, wherein the second data link protocol is a non-proprietary protocol including one of a J1939 protocol, a CAN protocol, a MODBUS protocol, a serial standard data link protocol, and an Ethernet protocol.

8. The method of claim 1, further including controlling, by the onboard module, a function performed by the machine based on the scaled second parameter value consistent with the first data link protocol contained in the fourth message.

9. The system of claim 4, wherein the onboard module is configured to control a function performed by the machine based on the scaled second parameter value compatible with the first data link contained in the fourth message.

* * * * *